(12) United States Patent
Liu

(10) Patent No.: US 12,090,115 B2
(45) Date of Patent: Sep. 17, 2024

(54) CABLE TENSION ADJUSTER FOR HEIGHT-ADJUSTABLE WHEELED VEHICLE

(71) Applicant: EVOLUTION TECHNOLOGIES INC., Port Coquitlam (CA)

(72) Inventor: Julian Liu, Port Moody (CA)

( * ) Notice: Subject to any disclaimer, the term of this patent is extended or adjusted under 35 U.S.C. 154(b) by 283 days.

(21) Appl. No.: 17/764,236

(22) PCT Filed: Sep. 28, 2020

(86) PCT No.: PCT/CA2020/000114
§ 371 (c)(1),
(2) Date: Mar. 28, 2022

(87) PCT Pub. No.: WO2021/062516
PCT Pub. Date: Apr. 8, 2021

(65) Prior Publication Data
US 2022/0347042 A1   Nov. 3, 2022

Related U.S. Application Data

(60) Provisional application No. 62/908,091, filed on Sep. 30, 2019.

(51) Int. Cl.
| | |
|---|---|
| *A61H 3/04* | (2006.01) |
| *A61G 5/10* | (2006.01) |
| *F16D 65/38* | (2006.01) |
| *F16D 125/60* | (2012.01) |

(52) U.S. Cl.
CPC .............. *A61H 3/04* (2013.01); *A61G 5/101* (2013.01); *A61G 5/1035* (2013.01); *A61H 2003/046* (2013.01); *A61H 2201/0161* (2013.01); *A61H 2201/0192* (2013.01); *A61H 2201/1633* (2013.01); *A61H 2201/1635* (2013.01); *F16D 65/38* (2013.01); *F16D 2125/60* (2013.01)

(58) Field of Classification Search
CPC ................ A61H 3/04; A61H 2003/046; A61H 2201/0161; A61H 2201/0192; A61H 2201/1633; A61H 2201/1635; A61G 5/101; A61G 5/1035; F16D 65/38; F16D 2125/60
See application file for complete search history.

(56) References Cited

U.S. PATENT DOCUMENTS

| | | | | |
|---|---|---|---|---|
| 3,678,964 | A * | 7/1972 | Andrews ................. | F16C 1/226 138/147 |
| 4,404,822 | A * | 9/1983 | Green ................... | E05B 67/006 224/935 |
| 4,518,817 | A * | 5/1985 | Kirby ....................... | H02G 9/10 137/356 |
| 4,694,706 | A | 9/1987 | Lichtenberg | |
| 5,348,336 | A | 9/1994 | Fernie | |

(Continued)

*Primary Examiner* — Frank B Vanaman
(74) *Attorney, Agent, or Firm* — PALMER IP INC.

(57) ABSTRACT

A cable tension adjuster for a manually operated, height-adjustable wheeled vehicle. The vehicle includes a brake assembly including a brake cable assembly and a brake cable housing shaped to enclose an excess portion of the brake cable assembly. The brake assembly includes a cable adjuster coupled to the brake cable assembly, where the cable adjuster is enclosed by the brake cable housing. The brake cable housing provides an access port to access the cable tension adjuster.

16 Claims, 19 Drawing Sheets

(56) References Cited

U.S. PATENT DOCUMENTS

| | | | |
|---|---|---|---|
| 6,212,969 B1 * | 4/2001 | Kuo | B62L 3/02 |
| | | | 188/19 |
| 6,899,202 B1 * | 5/2005 | McIntyre | B62L 1/10 |
| | | | 188/24.12 |
| 2002/0050697 A1 | 5/2002 | Hallgrimsson | |
| 2005/0067804 A1 | 3/2005 | Tolfsen | |
| 2007/0013158 A1 * | 1/2007 | Loniello | A61H 3/04 |
| | | | 280/87.021 |
| 2007/0137383 A1 * | 6/2007 | Boehm | B62L 3/00 |
| | | | 74/491 |
| 2008/0302201 A1 | 12/2008 | Tomandl | |
| 2009/0165208 A1 | 7/2009 | Reed | |
| 2017/0057473 A1 | 3/2017 | Liu | |
| 2018/0058526 A1 * | 3/2018 | Lee | B60T 7/107 |

* cited by examiner

CABLE TENSION ADJUSTER FOR HEIGHT-ADJUSTABLE WHEELED VEHICLE

FIELD

The present invention relates to a cable tension adjuster for a height-adjustable wheeled vehicle. In particular, the invention relates to a cable tension adjuster for a height-adjustable wheeled vehicle, such as a walker, a rollator, a transport chair, a wheelchair, a wheeled commode, an evacuation chair, or height-adjustable stretcher, and a brake assembly designed to accommodate the cable tension adjuster.

RELATED ART

U.S. Pat. No. 10,053,062 to Lui discloses a brake assembly for a height-adjustable walker apparatus. The brake assembly includes a brake actuator, a wheel-engaging brake member and a brake cable assembly. The brake cable assembly includes a flexible, inner cable, and a flexible, outer casing through which the inner cable extends and is moveable relative thereto. The inner cable has a first end coupled to the brake actuator and a second end coupled to the wheel-engaging brake member. The brake assembly includes a brake cable housing shaped to enclose a slack portion of the brake cable assembly.

U.S. Pat. No. 4,962,781 to Kanbar discloses a collapsible rolling cane adapted to assist an elderly or handicapped person in walking. The cane includes a front leg having a handle attached to its upper end at a height convenient to the user, with a single front wheel being mounted on the lower end. A shorter tubular rear leg is pivotally connected at its upper end to the leaf of a first hinge joined to the front leg at a position below the upper end thereof The lower end of the rear leg is joined to the midpoint of a transverse axle on either end of which a rear wheel is mounted. Bridging the legs is a foldable arm, one end of which is pivotally connected to the leaf of a second hinge joined to the front leg at a position above its lower end, the other end of the arm being pivotally connected through a longitudinal slot in the rear leg to a slide therein, whereby when the cane is collapsed to put it in an inactive state, the slide rides up the rear leg to fold the arm and position the front and rear legs in parallel relation, and when the cane is put in an active state, the slide rides down the rear leg to extend the arm and cause the front and rear legs to assume an acute angle and the front and rear wheels then engage the ground at the points of a triangle to render the rolling cane stable.

SUMMARY

The present invention provides, and it is an object to provide, a cable tension adjuster for a height-adjustable wheeled vehicle, and brake assembly housing to accommodate the cable tension adjuster. The present invention further provides a wheel fork assembly for the height-adjustable wheeled vehicle.

There is provided a brake assembly for a manually operated, height-adjustable wheeled vehicle according to a first aspect. The brake assembly includes a brake cable assembly. The brake assembly includes a brake cable housing shaped to enclose an excess portion of the brake cable assembly. The brake assembly includes a cable adjuster coupled to the brake cable assembly. The cable adjuster is enclosed by the brake cable housing.

There is also provided a brake assembly for a manually operated, height-adjustable wheeled vehicle according to a second aspect. The vehicle includes a height-adjustable assembly. The brake assembly includes a brake cable housing coupled to and extending laterally outwards from the height-adjustable assembly. The brake cable housing encloses a chamber and has an opening in communication with the chamber. The brake assembly includes a brake cable assembly. The brake cable assembly includes a first portion extending along the height-adjustable assembly. The brake cable assembly includes a second portion enclosed within the brake cable housing. The second portion of the brake cable assembly extends into the chamber via said opening and is movable anywhere within said chamber.

There is further provided a brake assembly for a manually operated, height-adjustable wheeled vehicle according to a third aspect. The vehicle includes a height-adjustable assembly. The brake assembly includes a brake cable assembly extending along the height-adjustable assembly. The brake assembly includes a brake cable housing shaped to enclose an excess portion of the brake cable assembly within a chamber thereof. The brake cable housing has an access port extending through an inner side planar portion thereof. The access port being in communication with the chamber.

There is additionally provided a wheel fork assembly for a manually operated, height-adjustable wheeled vehicle according to a first aspect. The vehicle includes a frame member. The wheel fork assembly includes a mount shaped to couple with a lower end of the frame member of the vehicle. The mount has a longitudinal axis. The wheel fork assembly includes a wheel fork having a longitudinal axis offset from the longitudinal axis of the mount The wheel fork is integrally coupled to and formed with the mount.

There is yet further provided a wheel fork assembly for a manually operated, height-adjustable wheeled vehicle according to a second aspect. The vehicle includes a frame member. The wheel fork assembly includes a mount. An upper portion of the mount is shaped to couple with a lower end of the frame member of the vehicle. A lower portion of the mount curves laterally outwards. The wheel fork assembly includes a wheel fork coupled to the lower portion of the mount.

There is yet also provided a wheel fork assembly for a manually operated, height-adjustable wheeled vehicle according to a third aspect. The wheel fork assembly includes a pair of elongate supports. The supports have lower portions between which a wheel is mountable. The supports have upper portions. An aperture extends through the upper portion of one said support. The wheel fork assembly includes an upper cover which couples together the upper portions of the supports. The wheel fork assembly includes aside cover that extends across the aperture and which is selectively removable.

There is yet additionally provided a wheel fork assembly for a manually operated, height-adjustable wheeled vehicle according to a fourth aspect. The vehicle includes a wheel-engaging brake member and a brake adjustment mechanism. The wheel fork assembly includes a pair of elongate supports between which a wheel is received and to which the wheel rotatably couples. The wheel fork assembly includes a housing which couples together the supports and extends about the wheel-engaging brake member and the brake adjustment mechanism. The housing includes a side cover. Removal of the side cover thereof provides access to the brake adjustment mechanism. The side cover aligns with one of the elongate supports.

There is also provided a wheel fork assembly for a manually operated, height-adjustable wheeled vehicle according to a fifth aspect. The vehicle includes a wheel-engaging brake member and a brake adjustment mechanism. The wheel fork assembly includes a pair of elongate supports between which a wheel is received and to which the wheel rotatably couples. The wheel fork assembly includes a housing which couples together the supports. The housing extends about the wheel-engaging brake member and the brake adjustment mechanism. The housing includes a cover. Removal of the cover provides access to the brake adjustment mechanism. The cover aligns with an inner side of the wheel fork assembly.

There is further provided a walker comprising one of the preceding brake assemblies and/or wheel fork assemblies. There is also provided a rollator comprising one of the preceding brake assemblies and/or wheel fork assemblies. There is additionally provided a transport chair comprising one of the preceding brake assemblies and/or wheel fork assemblies. There is yet further provided a combination transport chair and walker comprising one of the preceding brake assemblies and/or wheel fork assemblies. There is yet also provided a wheelchair comprising one of the preceding brake assemblies and/or wheel fork assemblies. There is yet additionally provided a wheeled commode comprising one of the preceding brake assemblies and/or wheel fork assemblies. There is also provided an evacuation chair comprising one of the preceding brake assemblies arid/or wheel fork assemblies. There is further provided a height-adjustable stretcher comprising one of the preceding brake assemblies and/or wheel fork assemblies.

BRIEF DESCRIPTION OF DRAWINGS

The invention will be more readily understood from the following description of preferred embodiments thereof given, by way of example only, with reference to the accompanying drawings.

DETAILED DESCRIPTION

Figure 1:
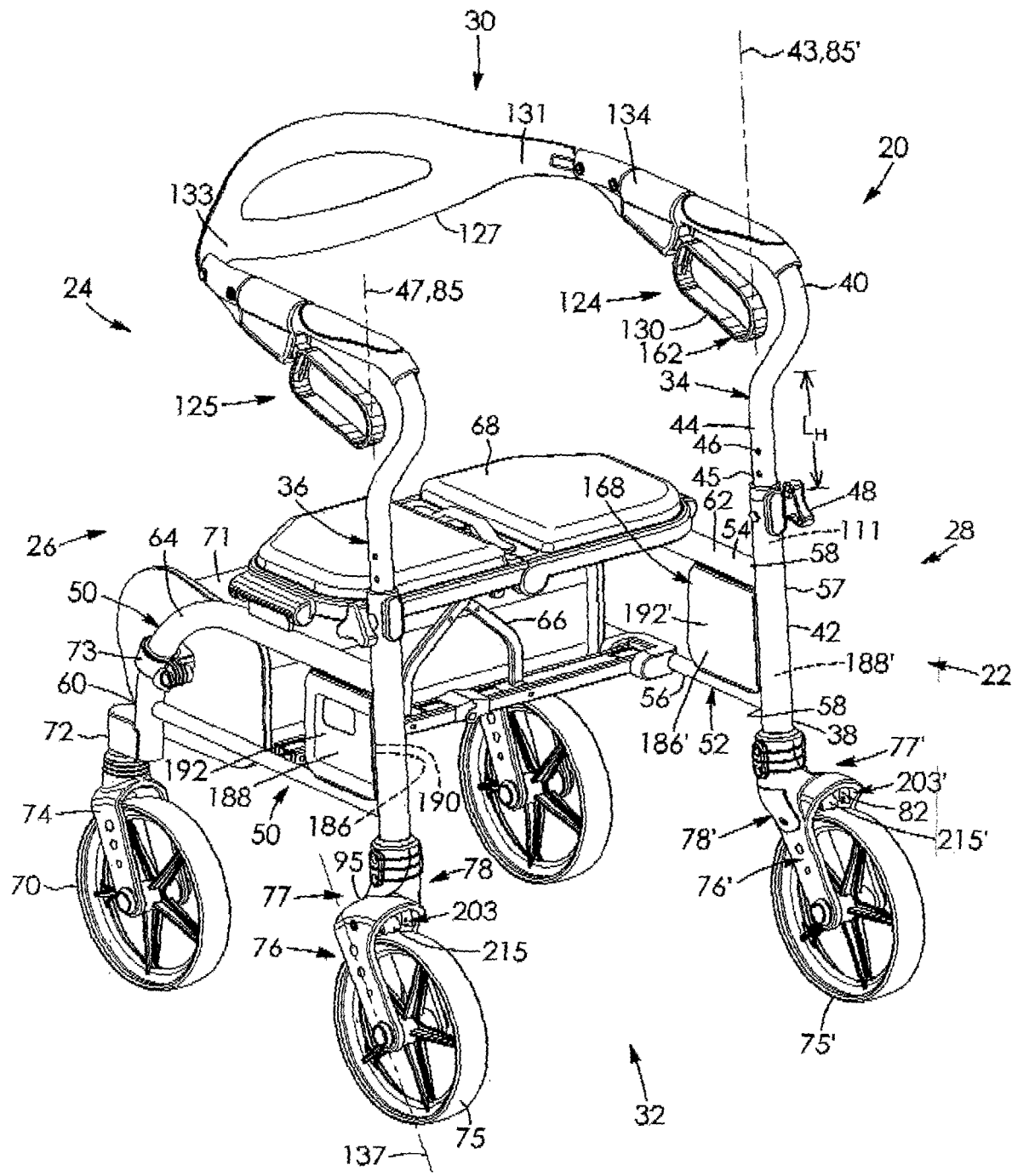
FIG. 1 is a rear, right side, top perspective of a manually operated, height-adjustable wheeled vehicle according to a first aspect, the vehicle comprising a walker apparatus that includes a folding mechanism, a seat assembly, a height-adjustable assembly shown in an extended position and a brake assembly, the brake assembly including a pair of brake cable housings coupled to the height-adjustable assembly.

Referring to the drawings and first to FIG. 1, there is shown a manually operated, height-adjustable wheeled vehicle. The vehicle may also be referred to as a transport apparatus or a travel-assistance apparatus and in this example comprises a height-adjustable walker apparatus 20. The walker apparatus may be referred to as a walker or rollator. The walker apparatus 20 has a rear 22 and a front 24, The walker apparatus has a pair of spaced-apart sides 26 and 28, a top 30 and a bottom 32 which is spaced-apart from the top. The rear 22 and front 24 of the walker apparatus 20 extend between the sides 26 and 28 thereof and the top 30 and bottom 32 thereof. The top and bottom of the walker apparatus also extend between the sides 26 and 28 thereof.

Still referring to FIG. 1, the walker apparatus 20 includes a pair of spaced-apart, upright, height/length-adjustable assemblies 34 and 36 aligning with respective ones of the sides 26 and 28 thereof. Each of the assemblies has a lower end and an upper end, as seen by lower end 38 and upper end 40 for assembly 34. Each of the assemblies is telescopic and there is height-adjustable, with a lower outer elongate member or tube, and an upper inner elongate member or tube shaped to fit within the lower tube. This is seen by outer tube 42 and inner tube 44 for assembly 34. As seen in FIG. 1, the assemblies 34 and 36 have longitudinal axes 43 and 47. Portions 57 of outer tubes 42 and telescoping portions 45 of inner tubes 44 extend along respective said axes.

Figure 3:
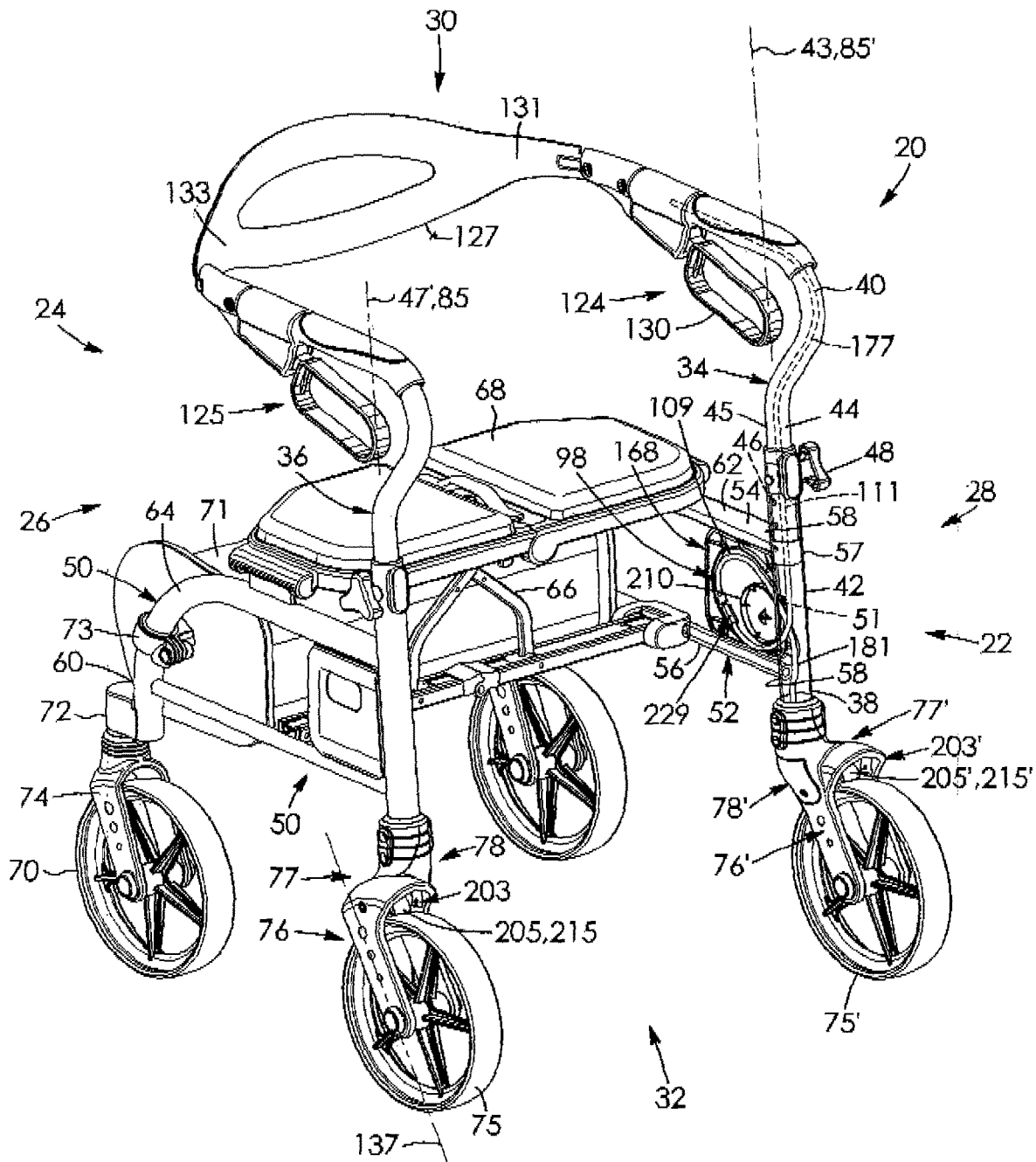
FIG. 3 is a rear, right side, top perspective of the walker apparatus of FIG. 2, with the height-adjustable assembly being shown in a retracted position.

As seen in FIG. 1, each of the inner tubes 44 has a plurality of longitudinally spaced-apart apertures 46 which provide a length LH of adjustment range. The walker apparatus 20 includes a pair of coupling mechanisms for selectively coupling the pairs of telescoping tubes 42 and 44 together, in this example in the form of thumb screws 48. The thumb screws are threadably coupled to the outer tubes 42 in this example, Selective rotation of the thumb screws causes the thumb screws to be selectively inserted through one of said apertures 46 of the inner tube 44 to fixedly adjust the height of the telescoping tubes. This enables the height of the walker apparatus to be adjusted to provide an optimized handlebar height for the user. The height of the walker apparatus is thus adjustable from a retracted position of the tubes 42 and 44 seen in FIG. 3 to an extended position of the tubes seen in FIG. 1 as well as positions therebetween.

Figure 4:
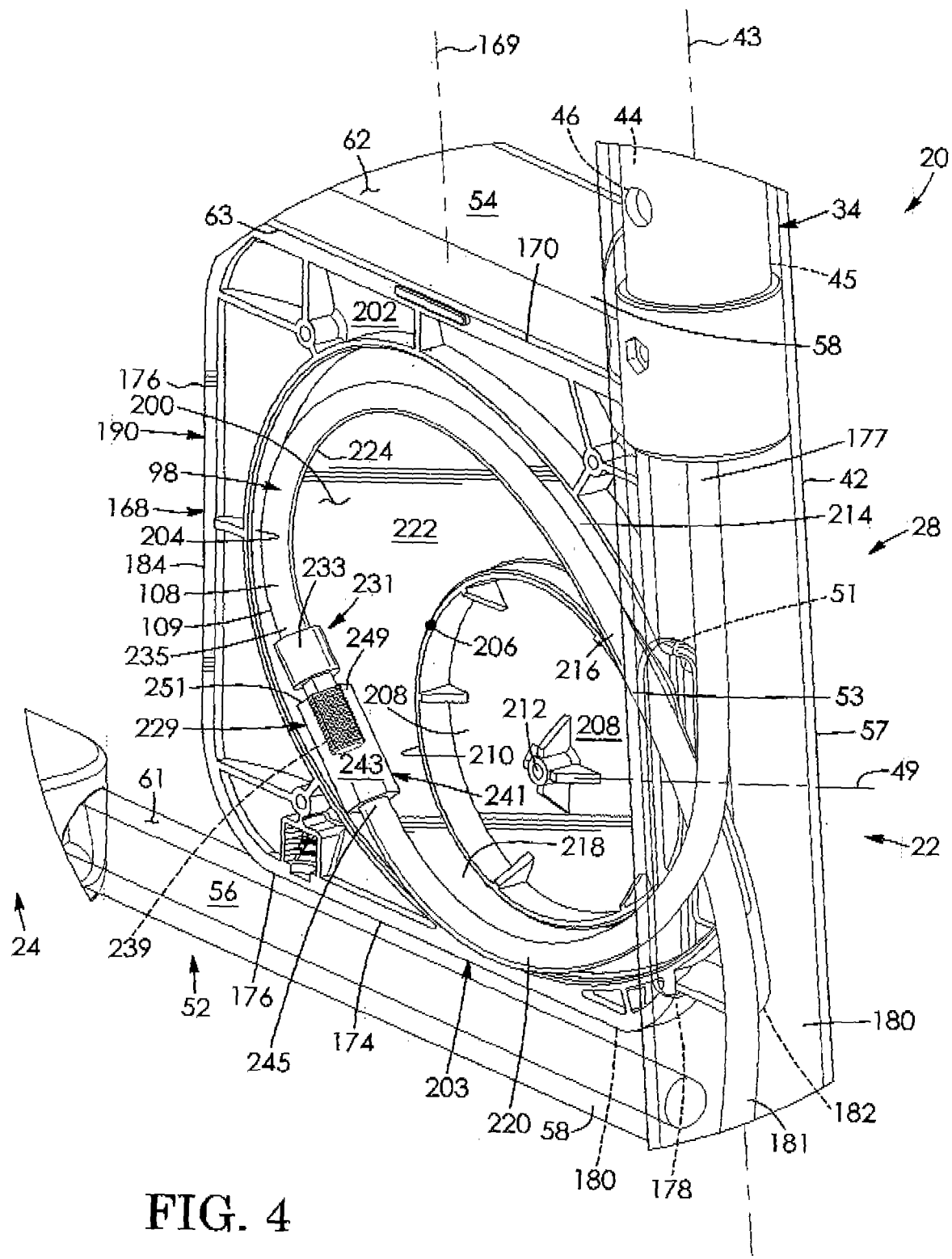
FIG. 4 is an enlarged, inner side perspective view of the partially unassembled brake cable housing of FIG. 3 and revealing a slack portion of the brake cable assembly enclosed therewithin, the brake assembly including a cable adjuster shown in a retracted position, with the rest of the walker apparatus being shown in fragment and with transparent shading to reveal the interior components thereof.

As seen in FIG. 4, each of the outer tubes 42 of the height-adjustable assemblies 34 has an aperture 51 extending therein. Each aperture extends about a lateral axis 49 that is perpendicular to the longitudinal axis 43 of its corresponding assembly 34. Each aperture 51 is slot shaped and around in this example; however, this is not strictly required. Each aperture faces the front 24 of the walker apparatus 20 in this example and extends through a front portion 180 of the tube 42. Each aperture 51 is interposed between the lower end 38 and upper end 40 of its height-adjustable assembly 34 seen in FIG. 1. Each aperture is adjacent to and spaced-apart upwards from the corresponding end 38 of its height-adjustable assembly seen in FIG. 1.

Still referring to FIG. 1, the walker apparatus 20 includes a pair of spaced-apart laterally-extending assemblies 50 and 52. The laterally-extending assemblies align with respective ones of the sides 26 and 28 of the walker apparatus and extend from near the bottom 32 towards the top 30 thereof. Each of the laterally-extending assemblies includes a pair of spaced-apart, elongate upper and lower side members, or side frame members, with the upper members being in the form of tubes 54 in this example and the lower members being the form of tubes 56 in this example. Each tube has a proximal end 58 coupled to corresponding outer tube 42 and a distal end 60 spaced-apart from its proximal end. Rods 56 thus couple to and extend radially outwards from tubes 42 and height-adjustable assemblies 34 and 36. Each tube 56 extends laterally-outwards and perpendicular from its corresponding outer tube 42 towards the front 24 of the walker apparatus 20, in this example. As seen in FIG. 4, each tube has a longitudinally extending top 61 which faces corresponding tube 54 of its laterally-extending assembly 50. The tops of the tubes are curved at least in part in lateral cross-section and outwardly convex in lateral cross-section in this example.

Still referring to FIG. 4, each tube 54 includes a substantially straight portion 62 in this example which is coupled to and extends laterally-outwards from corresponding outer tube 42 towards the front 24 of the walker apparatus 20. Aperture 51 of tube 42 is interposed and extends between tube 56 and substantially straight portion 62 of tube 54 and is positioned adjacent to tube 56 in this example. Each straight portion 62 of the tubes 54 has a longitudinally extending bottom 63 which face the top 61 of its corresponding tube 56. The bottoms of the straight portions of the tubes 54 are curved at least in part in lateral cross-section and outwardly convex in lateral cross-section in this example. As seen in FIG. 1, each tube includes a curved portion 64 i.e. this example which couples to and is interposed between the straight portion thereof and distal end 60 of its corresponding tube 56.

Still referring to FIG. 1 the walker apparatus includes folding mechanism 66 in this example coupled to and extending between the laterally-extending assemblies 50 and 52. The folding mechanism is configured to enable the walker apparatus 20 to selectively fold laterally. The walker apparatus includes a seat assembly 68 which extends between and pivotally couples to the straight portions 62 of tubes 54 of the laterally extending assemblies 50 and 52 in this example. The walker apparatus 20 includes a foldable basket 71 adjacent to the front 24 thereof and which couples to and extends between laterally extending assemblies 50 and 52 thereof via connectors 73. The various parts and functionings of the folding mechanism 66, seat assembly 68 and foldable basket are described in more detail in U.S. Pat. No. 8,083,239 and United States Patent Application Publication No. 2019/0009758 A1, the disclosures of which are incorporated herein by reference.

As seen in FIG. 1, the walker apparatus 20 includes a first or front pair of ground-engageable wheels 70 operatively coupled to and pivotable relative to the distal ends 72 of the curved portions 64 of tubes 54 by way of front wheel forks 74.

Still referring to FIG. 1, the walker apparatus includes a second or rear pair of ground-engageable wheels 75 and 75' operatively coupled to and rotatable relative to the lower ends 38 and 38' of the height-adjustable assemblies via wheel fork assemblies 76 and 76', in this example the wheel fork assemblies are rear wheel fork assemblies. Like parts have like numbers and functionings with the addition of extension. The wheel fork assemblies 76 and 76' have outer sides 77 and 77' which align with sides 26 and 28 of the walker apparatus 20. The wheel fork assemblies have inner sides 78 and 78' which are inwardly facing and which face each other.

Figure 8:
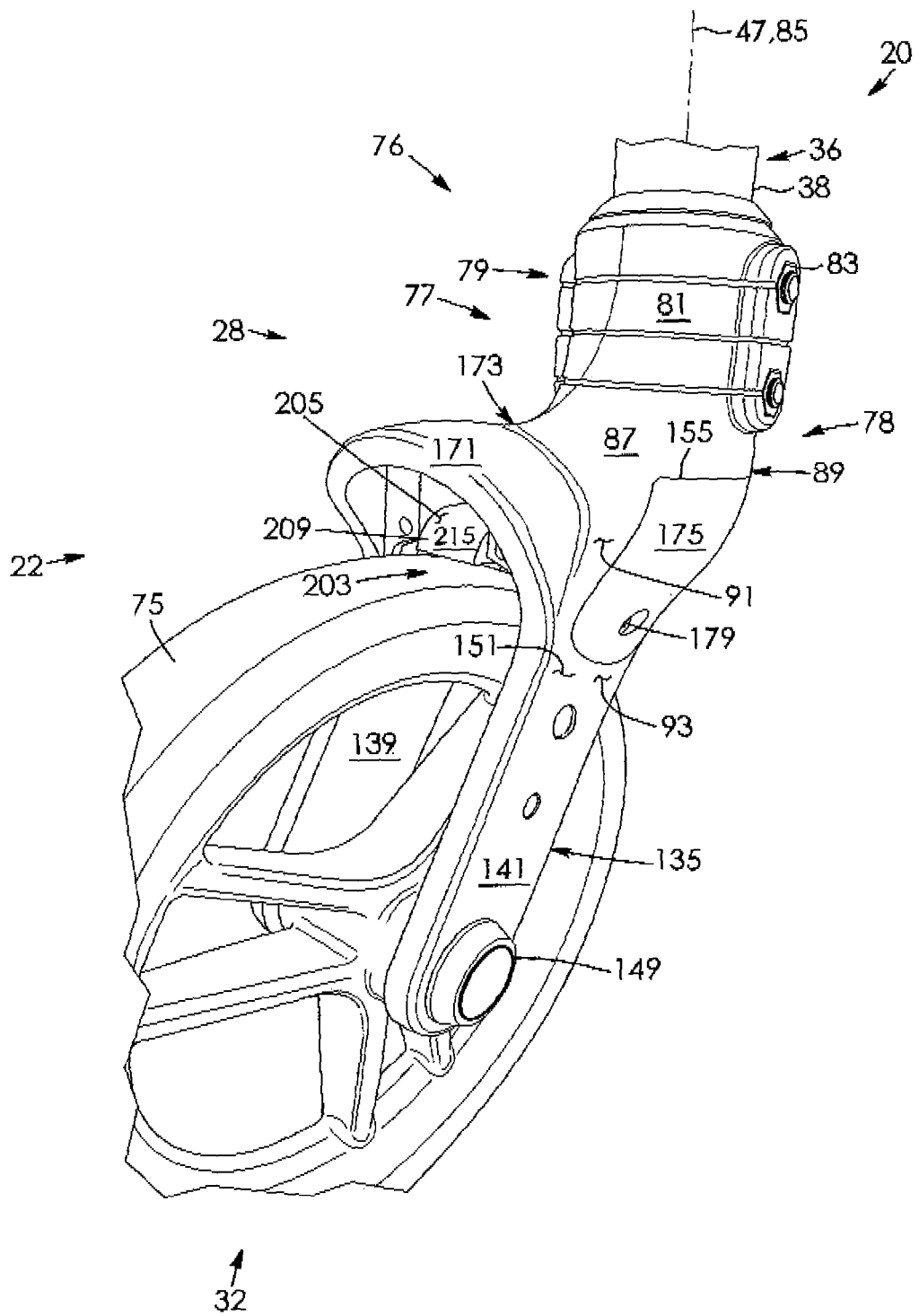
FIG. 8 is a rear, inner side perspective view of the rear wheel fork assembly of FIG. 7, the rear wheel fork assembly including a side cover, and with the wheel and height-adjustable assembly of FIG. 7 being shown in fragment.

As seen in FIG. 8, each wheel fork assembly 76 includes a mount 79 having an upper portion 81 which is tubular in this example. The upper portion of the mount is shaped to receive the lower end 38 of its corresponding tube 42 and couple thereto via fasteners, in this example bolts 83. The upper portion 81 of the mount 79 has a longitudinal axis 85 which is coaxial with the longitudinal axis 47 of the corresponding height-adjustable assembly 36 of the walker apparatus 20.

Figure 7:
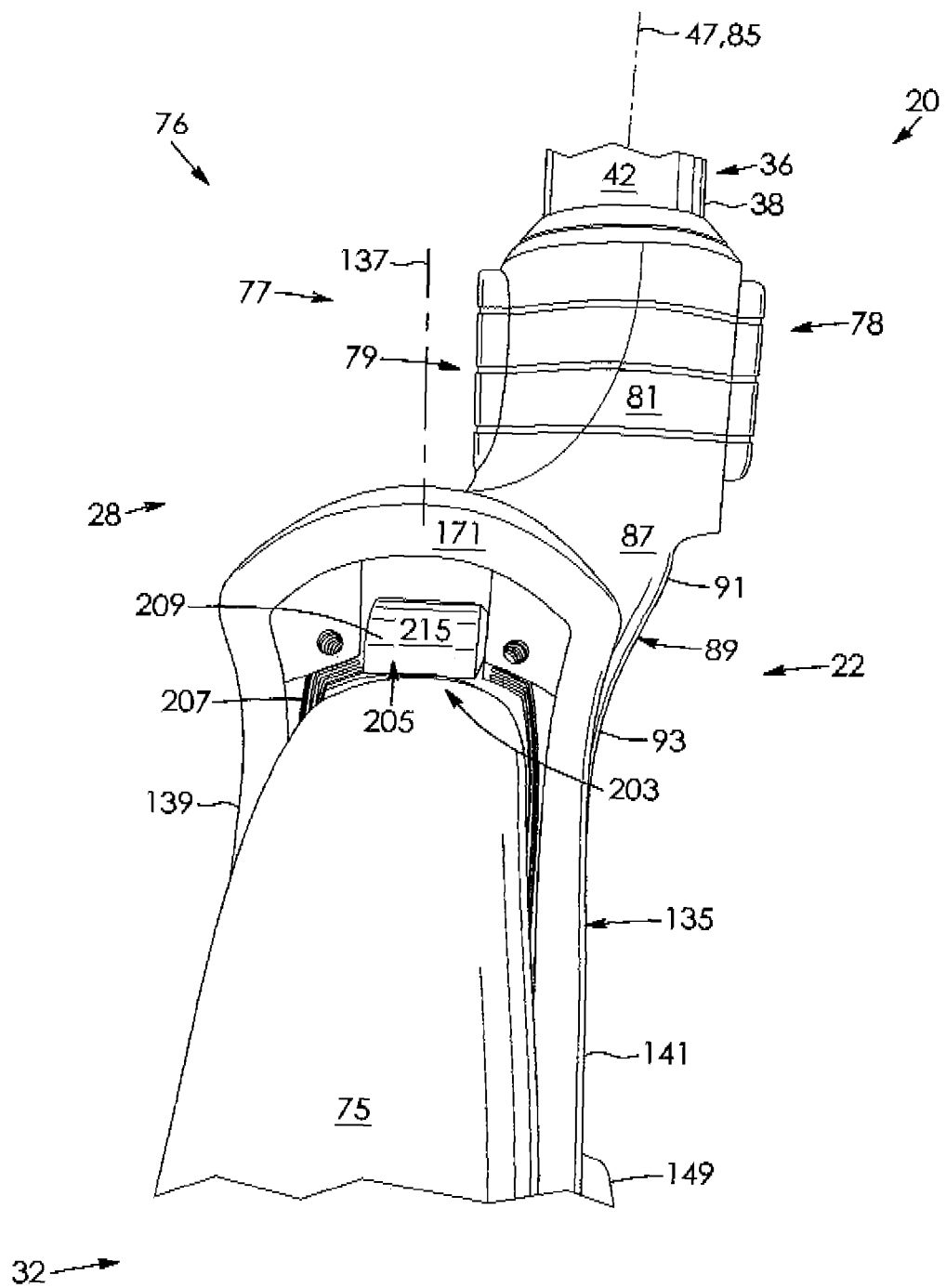
FIG. 7 is a rear elevation view of a rear, right side wheel fork assembly of the walker apparatus of FIG. 1, with a wheel, of the walker apparatus and one of the height-adjustable assembly of the walker apparatus being shown in fragment.
Figure 11:
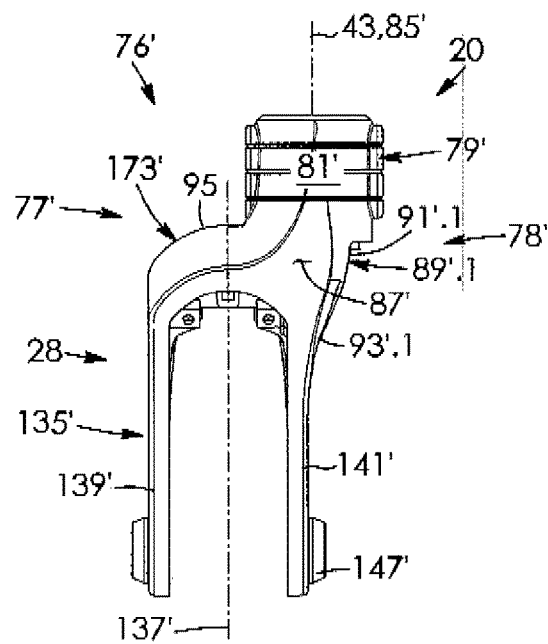
FIG. 11 is a front elevation view of the rear, left side wheel fork assembly of FIG. 10, with the brake and brake adjustment mechanism thereof being removed and not shown.

As seen in FIG. 7, each mount 79 includes a lower portion 87 that couples to and is integrally formed with the upper portion 81 thereof. The lower portion of the mount extends laterally outwards relative to the axis 85, of the upper portion of the mount and axis 47 of the corresponding height-adjustable assembly 36, from the upper portion of the mount towards the bottom 32 and corresponding side 28 of the walker apparatus 20. The lower portion 87 of the mount 79 has an inner surface 89 which extends along the inner side 78 of the wheel fork assembly 76 in this example. The inner surface of the lower portion of the mount has an upper region 91 which is outwardly convex. The inner surface 89 of the lower portion 87 of the mount 79 has a lower region 93 adjacent to wheel 75 and which is outwardly concave in this example. The inner sides 78 of the wheel fork assemblies are thus outwardly concave in part and outwardly convex in part in this example. The outer sides of the lower portion of the mount are outwardly convex in this example, as seen by outer side 95' in FIG. 11.

Referring to FIG. 8, each wheel fork assembly 76 includes a wheel fork 135. The wheel fork couples to the lower portion 87 of the mount 79 and in this example is integrally coupled to and formed with the mount. As seen in FIG. 7, each wheel fork 135 mount has a longitudinal axis 137 that is laterally offset from the longitudinal axis 85 of its corresponding mount 79.

Figure 9:
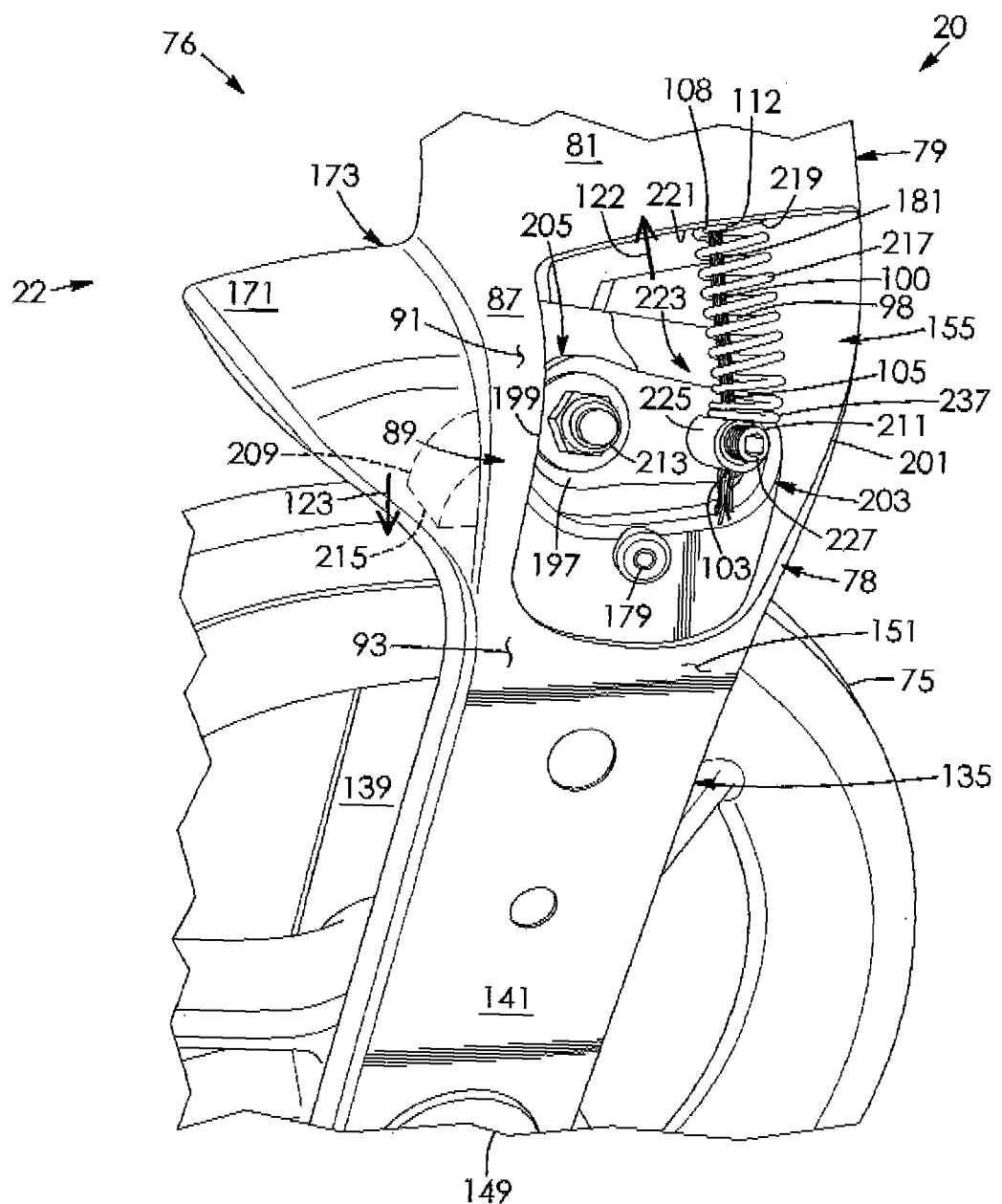
FIG. 9 is an inner side elevation view of the rear wheel fork assembly of FIG. 8, with the side cover thereof being removed to reveal a brake adjustment mechanism of the brake assembly of the walker apparatus, and with the wheel and rear wheel fork assembly of FIG. 8 being shown in fragment.
Figure 10:
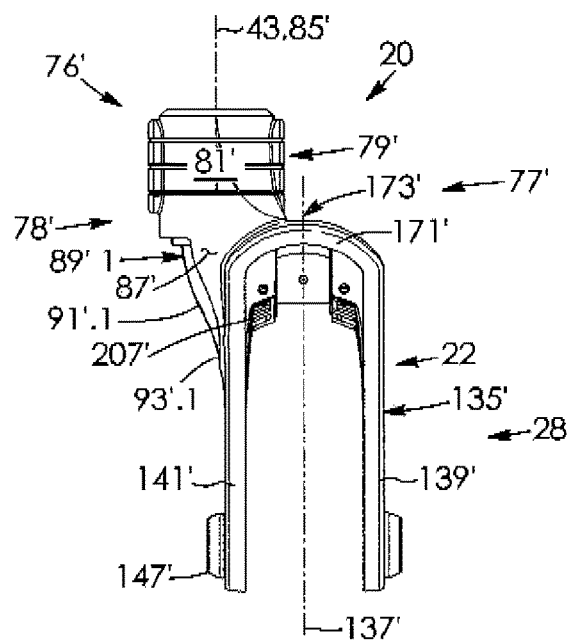
FIG. 10 is a rear elevation view of a rear, left side wheel fork assembly of the walker apparatus of FIG. 1, with a brake and brake adjustment mechanism thereof being removed and not shown.
Figure 12:
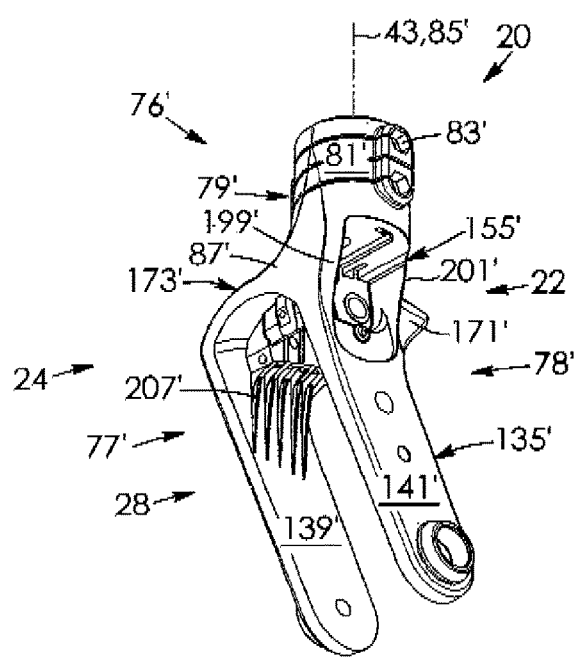
FIG. 12 is a front, inner side, bottom perspective view of the rear, left side wheel fork assembly of FIG. 10, with a side cover thereof, the brake and the brake adjustment mechanism thereof being removed and not shown.
Figure 13:
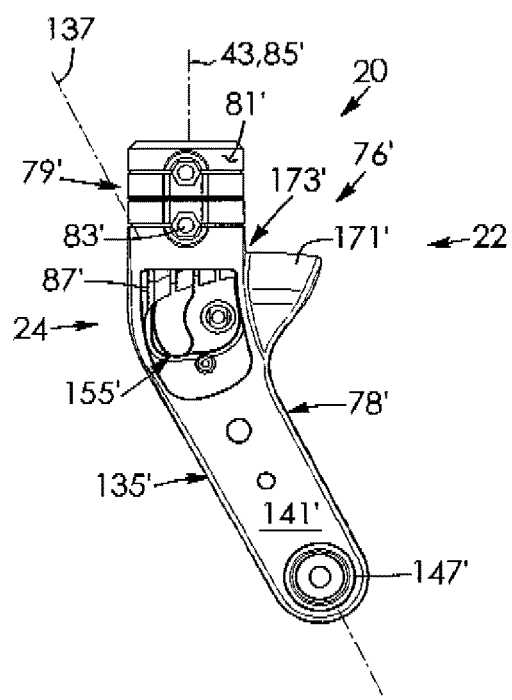
FIG. 13 is an inner side elevation view of the rear, left side wheel fork assembly of FIG. 10, with the side cover, the brake and the brake adjustment mechanism thereof being removed and not shown.

Referring to FIG. 8, the wheel fork includes a pair of elongate inner and outer supports 139 and 141 with lower portions 149 between which wheel 75 is received and to which the wheel rotatably couples. Each of the elongate supports is planar in shape in this example and may be referred to a planar portion of the wheel fork. As seen in FIG. 7, the wheel fork 135 is shaped to receive the wheel 75 therebetween such the wheel is forward facing and laterally outwardly spaced from tube 42. As seen in FIG. 10, inner support 141' aligns with the longitudinal axis 85' of mount 79' and longitudinal axis 85' of assembly 34 seen in FIG. 1 in this example. Referring to FIG. 9, each of the inner elongate supports 141. has an upper portion 151 with an aperture 155 extending therethrough. As seen in FIG. 12, each of the supports includes a plurality of strengthening ribs 207' coupled thereto. The ribs of the two supports 139' and 141' face each other and are positioned between the supports.

Referring to FIG. 8, each wheel fork 135 includes an upper cover 171 which couples together the upper portions 151 of the supports 139 and 141. The upper cover is arc-shaped in this example. The upper cover 171 and upper portions 151 of the supports 139 and 141 form a wheel fork housing 1.73. The wheel fork housing includes a side cover 175 that extends over aperture 155. As seen in FIG. 12, the wheel. fork housing 173' includes a pair of outwardly extending flanges 199' and 201' between which the. aperture 155' extends and between which the side cover extends. As seen in FIG. 8, the side cover 175 is outwardly curved and in this example is outwardly convex. The side cover aligns with the upper portion 151 of the inner support 141 of its corresponding wheel fork 135 and extends along the inner side 78 of the wheel fork assembly 76 in this example. The wheel fork assembly includes a fastener, in this example screw 179 via which the side cover 175 couples to the inner support. The side cover is thus selectively removable.

Figure 2:
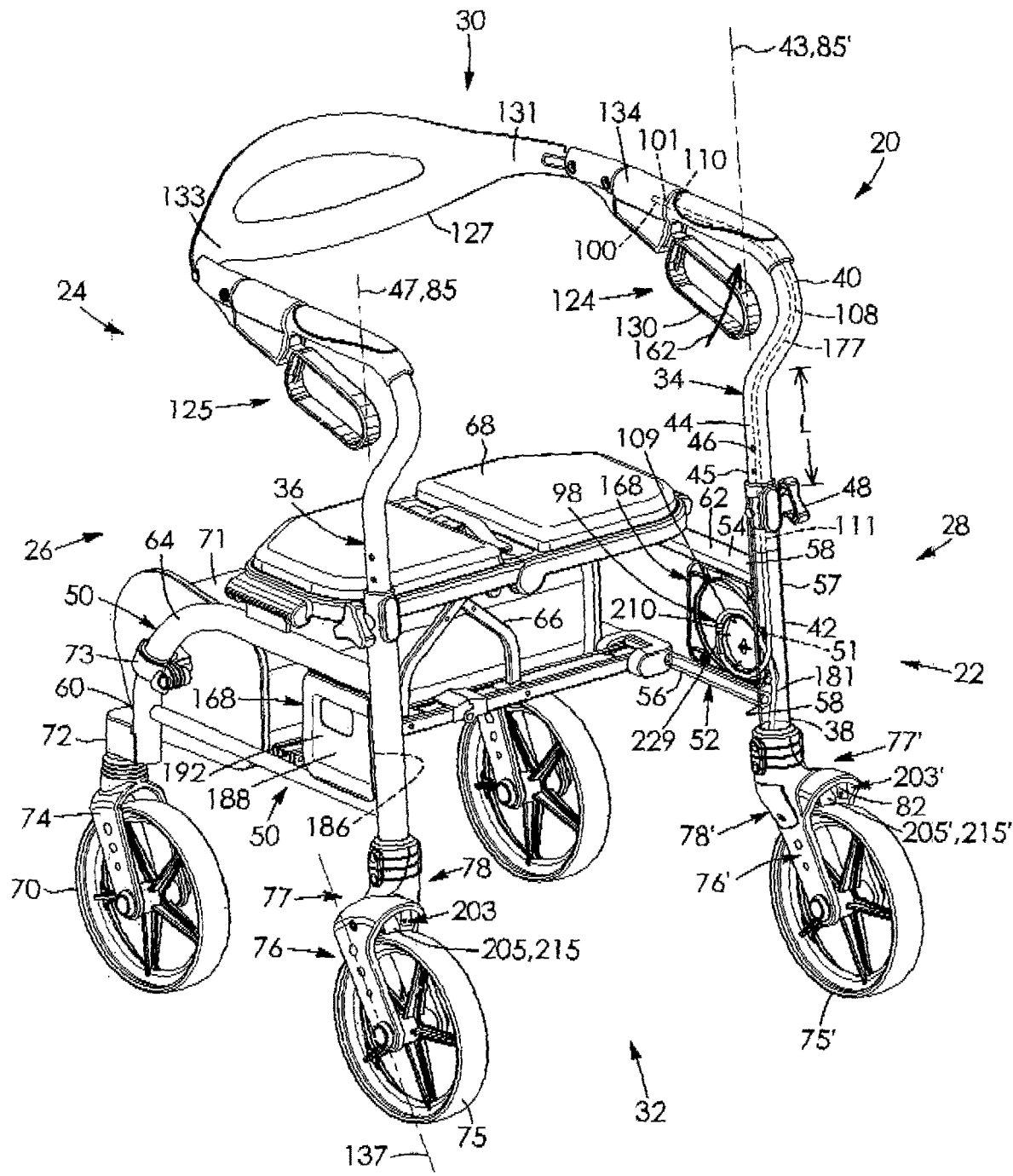
FIG. 2 is a rear, right side, top perspective of the walker apparatus of FIG. 1, with one of the brake cable housings being showy partially unassembled to reveal interior components thereof, and the brake assembly including a pair of brake cable assemblies one of which is shown partially in ghost

As seen in FIG. 2, the walker apparatus 20 includes a pair of brake assemblies 203 and 203' for its rear wheels 75 and 75'. Each brake assembly includes a wheel-engaging brake member 205. As seen in FIG. 9, each brake member has a first end 209 and a second end 211 spaced-apart from the first end. In this example each brake member 205 pivotally connects to its respective wheel fork 78 via bearing 197 which is interposed between the first and second ends of the brake member. The bearing rotatably mounts to and pivots about shaft 213 coupled to the wheel fork. Each brake member 205 includes a brake pad 215 in this example coupled to and extending downwards from the first end 209 thereof. Each brake pad faces its corresponding wheel 75.

Each brake member 205 includes in this example a resilient member in the form of a coil spring 217. The coil spring has an upper end 219 which abuts upper wall 221 of the wheel fork 135 in this example. The coil spring 217 has a lower end 237 which abuts end 211 of the brake member 205. The coil spring is configured to spring-bias the brake pad, 215 upwards from wheel 75.

Still referring to FIG. 9, each brake assembly 203 includes a brake adjustment mechanism 223. The brake adjustment mechanism in this example includes a sleeve 225 coupled to the end 211 of the brake member 205. The lower end 237 of the coil. spring 217 abuts the sleeve. The brake adjustment mechanism 223 includes a set screw 227 threadably coupled to the sleeve 225. Housing 173 is shaped to extend about the brake member 205 and brake adjustment mechanism 223. Aperture 155 is in communication with the brake adjustment mechanism. Selective removable of the side cover 175, seen in FIG. 8, provides access to the brake adjustment mechanism 223 seen in FIG. 9.

Referring to FIG. 2, each brake assembly 203 further includes a brake cable assembly 98, in this example in the form of Bowden-type brake cable assembly. The brake cable assembly includes a flexible, inner cable 100 seen in FIG. 9 that is made of metal in this example. Referring to FIG. 2, the cable has an upper or first end 101. As seen in FIG. 9, each cable 100 has a lower or second end 103. The second end of the cable 300 is operatively coupled to the second end 211 of brake member 205, in this example via portion 10 of the cable extending through sleeve 225, with set screw 227 thereafter being tightened to engage with said portion 105. The set screw enables the tension of cable 100 to be adjusted by lowering or elevating end 103 of the cable and thereafter securing the cable in place via the set screw.

As seen in FIG. 2, each brake cable assembly 98 has a first and in this example generally straight and elongate portion 111 which extends along the height-adjustable assembly 34. In this example the elongate portion of the brake cable assembly is primarily enclosed within its corresponding height-adjustable assembly 34 in this example. However, this is not strictly required; for example, the elongate portion of the brake cable assembly may extend along the outside of the height-adjustable assembly in other embodiments. The elongate portion 111 of the brake cable assembly 98 extends generally parallel with longitudinal axis 43 where the elongate portion enters within outer tube 42 and the telescoping portion 45 of the inner tube 44.

Figure 5:
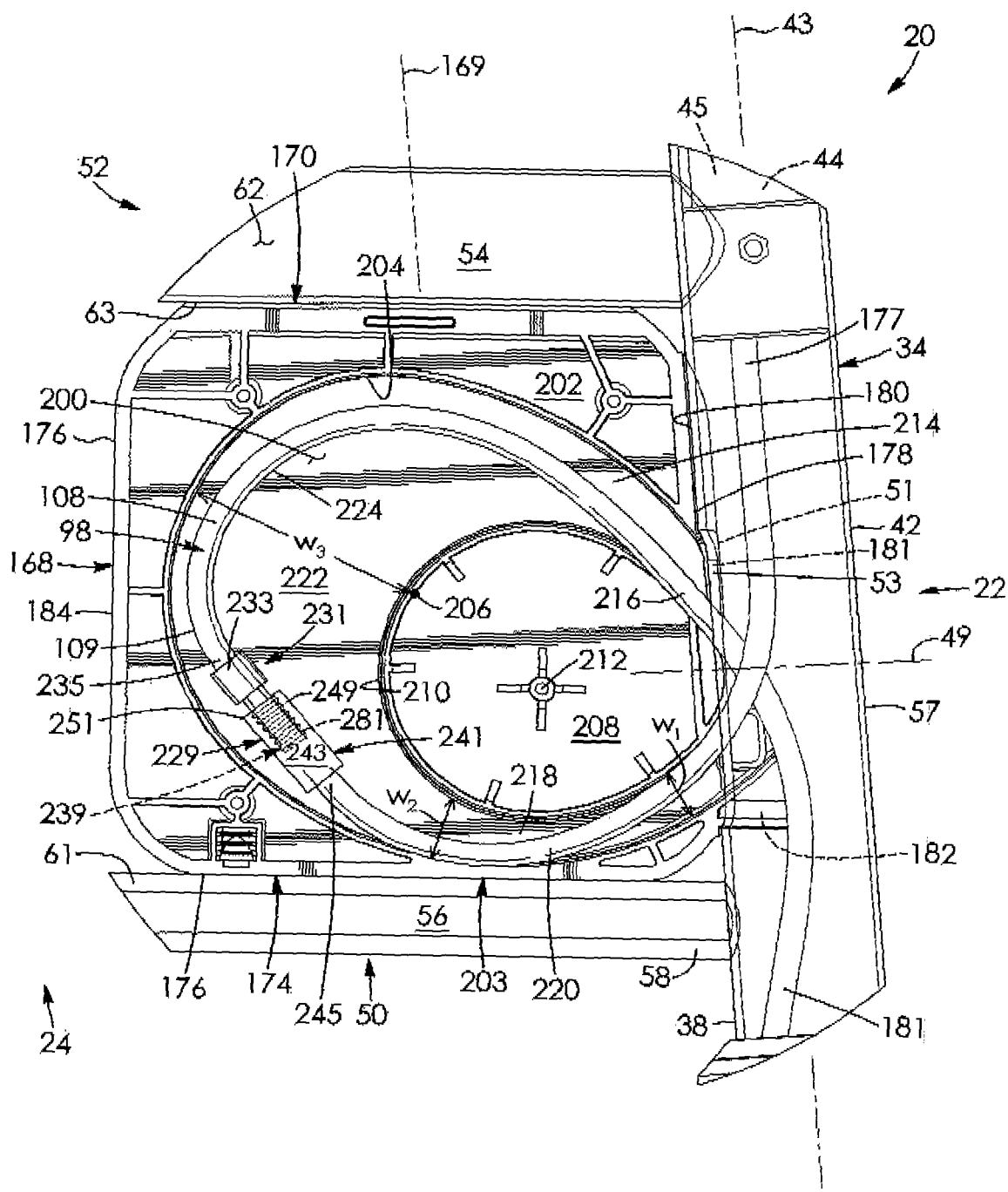
FIG. 5 is an inner side elevation view of the brake cable housing of FIG. 4, with the cable adjuster shown in its retracted position, and the rest of the walker apparatus being shown in fragment and with transparent shading to reveal the interior components thereof.

As seen in FIG. 4, each cable has a second or excess portion, in this example a slack portion 109 that is loop shaped. The slack portion is thus a coiled section of the brake cable assembly comprising a single loop in this example. The slack portion 109 of the brake cable assembly extends through the aperture 51 of tube 42. As seen in FIG. 5, the slack portion of the brake cable assembly 98 extends laterally outwards relative to longitudinal axis 43 from assembly 34 and generally in the direction lateral axis 49.

Each brake cable assembly 98 includes a flexible outer casing or cable sleeve 108 through which cable 100, seen in FIG. 9, extends and is moveable relative thereto. The cable sleeve may be referred to as a cable sleeve and is made of plastic in this example. The cable sleeve 108 has a first end 110 seen in FIG. 2 and a second end 112 seen in FIG. 9. Second end 11.2 of the cable sleeve couples to wheel fork 135 via a mount 79 through which cable 100 extends. Upward movement of cable 100, as shown by arrow of numeral 122, causes end 21.1 of brake member 205 to more upwards relative to FIG. 9. This in turn causes end 209 and brake pad 215 of the brake member to move downwards, as shown by arrow of numeral 123, for selectively engaging the pad against the wheel 75 and braking the wheel. Thus, each brake member 205 operatively connects to the lower end 38 of its height-adjustable assembly 34 seen in. FIG. 2. The brake member as herein described is one example only for walker apparatus 20 and the brake assembly 203 may use other braking systems for, the brake cable assembly 98 in other embodiments.

As seen in FIG. 2, the walker apparatus 20 includes a pair of handle bar assemblies 124 and 125 coupled to the upper ends 40 of respective ones of the height-adjustable assemblies 34 and 36. The walker apparatus includes an arcuate-shaped backrest 127 positioned along the front 24 thereof. The backrest is in the shape of a flexible strap in this example and extends between the handlebar assemblies 124 and 125. The backrest 127 couples to the handlebar assemblies via spaced-apart ends 131 and 133 of the backrest.

Still referring to FIG. 2, each of the handlebar assemblies includes a brake actuator, in this example in the form of a gripping handle 130 pivotally mounted to a respective handlebar housing 134. First end 1.01 of cable 100 operatively couples to the gripping handle. Upward movement of the gripping handles 130, as shown by arrow of numeral 162, causes the cable of the brake cable assembly 98 to be actuated, pulled and moved relative to casing 108 of the brake cable assembly for selectively actuating brake member 205 seen in FIG. 9. Gripping handles and brake actuators for brake assemblies are known per se and more details in this regard are disclosed, for example, in U.S. Pat. No. 8,083,239, the disclosure of which is incorporated herein by reference.

As seen in FIG. 1, the walker apparatus 20 includes a pair of hollow, brake cable housings corresponding to respective ones of the height-adjustable assemblies, as seen by brake cable housing 168 for height-adjustable assembly 34. Referring to FIG. 2, each brake cable housing is shaped to enclose the slack portion 109 of its corresponding brake cable assembly 98. Each brake cable housing 168 is generally rectangular in the shape in this example in side, top, bottom, rear and front profile.

As seen in FIG. 4, each brake cable housing has an elongate top 170 shaped to align with and receive the bottom 63 of the substantially straight portion 62 of tube 54 in this example. Each brake cable housing 168 has an elongate bottom 174 opposite its top 170. The: bottom of the brake cable housing is shaped to align with, extend along in part and receive the top 61 of tube 56 in this example. Each brake cable housing 168 further includes an elongate rear 178 which extends between the top 170 and bottom 174 thereof. The rear of the brake cable housing extends along and is shaped to abut and receive a front portion 180 of tube 42 of its corresponding height-adjustable assembly 34 extending between tubes 54 and 56 in this example. However, this manner and location of connection is not strictly required and instead of directly connecting, the brake cable housing may merely operatively connect to the height-adjustable assembly 34 in other embodiments. As seen in FIG. 5, brake cable housing 168 thus couples to and has a longitudinal axis 169 axially offset from the tubes 42 and 44 of assembly 34. The brake cable housing thus couples to and extends laterally outwards from the assembly 34 in this example.

As seen in FIG. 4, each brake cable housing 168 includes a hollow protrusion 182 which extends outwards from rear 178 thereof. The protrusion is shaped to fit within tube 42 via aperture 51. Portions 53 of tube 42 extending around aperture 51 are configured to snugly abut with the protrusion in this example. Each brake cable housing 168 has a front 184 spaced-apart from the rear 178 thereof. The front of the brake cable housing extends between the top 170 and bottom 174 thereof. The front 184 of the brake cable housing 168 is substantially vertically extending and straight in this example.

Referring to FIG. 1, the brake cable housings include a pair of spaced-apart side planar portions, in this example inner side planar portions, in this case inner sides 186 and 186', and exterior side planar portions, in this case outer sides 188 and 188'. The outer sides extend along sides 26 and 28 of the walker apparatus 20. The outer sides 188 and 188' face opposite from the inner sides 186 and 186'. The inner and outer sides of the brake cable housings 168 are substantially planar and rectangular in this example. Each side extends between the top 170, bottom 174, rear 178 and front 184 of the brake cable housing seen in FIG. 4. Still referring to FIG. 4, the brake cable housing 168 includes a peripheral portion 176 which extends along the top 170, front 384, bottom 174 and rear 178 thereof. The peripheral portion extends about the inner side 186 and outer side 188 thereof seen in FIG. 2.

As seen in FIG. 4, each brake cable housing 168 includes a first part 190 which extends between top 170, bottom 174, rear 178 and front 184 thereof and which extends from its inner side towards its outer side. As seen in FIG. 2, each brake cable housing I68 includes a second part 192 that is complementary to, selectively connectable to and selectively removable from part 190. Parts 190 and 192 are respective halves of the brake cable housing in this example though this is not strictly required. Part 192 extends between the top, bottom, rear and front of the brake cable housing, and extends from the outer side towards the inner side of the brake cable housing.

As seen in FIG. 4, each brake cable housing 168 has an interior or interior space 200 that is generally crescent-shaped in this example. Each brake cable housing has an outer portion 202 which extends along the top 170, bottom 174, rear 178, and front 184 thereof The outer portion 202 of the brake cable housing has an inner wall or peripheral edge 204 which encloses the interior space 200 thereof along with the sides of the brake cable housing. The inner peripheral edge of the outer portion is inwardly concave and is generally arc-shaped, in this case tear-drop shaped in this example. The peripheral edge 204 seen, in FIG. 4 extends between the sides 186 and 188 of the brake cable housing seen in FIG. 1. Referring back to FIG. 4, the outer portion 202 of the brake cable housing has a central axis 206 in this example.

Each brake cable housing 168 includes an inner portion 208 positioned within the interior space 200 thereof, The inner portion of the brake cable housing includes an inner wall or outer peripheral edge 210 which is outwardly convex and arc-shaped in this example. The outer peripheral edge extends between the sides 186 and 188 of the brake, cable housing 168 seen in FIG. 1. Referring back to FIG. 4, the inner portion 208 of the brake cable housing 168 has a central axis 212 which is axially offset from the central axis 206 of the outer portion 202 of the brake cable housing.

Still referring to FIG. 4, the brake cable housing 168 receives and in this example encloses the slack portion 109 of brake cable assembly 98 within interior space 200 thereof. The brake cable housing includes an upper passageway 214 within the interior space thereof The upper passageway extends from the rear 178 of the brake cable housing adjacent to aperture 51 towards the top 170 and front 184 of the brake cable housing. The upper passageway 214 is arc-shaped and downwardly concave in shape in this example. The upper passageway is shaped to receive excess portions 216 of the brake cable assembly 98 extending from the wheel-engaging brake member 205 and thus lower end 103 of cable 100 seen in FIG. 9.

As seen in FIG. 5, the brake cable housing 168 includes a lower passageway 218 within the interior space 200 thereof. The lower passageway extends through protrusion 182 of the brake cable housing 168 in this example towards the bottom 174 and front 184 of the brake cable housing. The lower passageway 218 is arc-shaped and upwardly concave in shape in this example. The lower passageway is shaped to receive excess portions no of brake cable assembly 98 extending from the gripping handle 130 as seen in FIG. 2 and thus extending from end 101 of cable 100.

Referring back to FIG. 5, each brake cable housing 168 includes a chamber 222 within the interior space 200 thereof. The brake cable housing encloses the chamber within the interior space. Chamber 222 is defined by and spans between peripheral edges 204 and 210 and sides 186 and 188 of the brake cable housing seen in FIG. 2 in this embodiment. The chamber is interposed between and in communication with the passageways 214 and 218. The upper and lower passageways may be referred to as openings in communication with the chamber. The cross-sectional widths of the upper passageway 214 and the lower passageway 218 taper to increase as the passageways extend from the height-adjustable assembly 34 towards the chamber 222. This is shown by width $W_1$ of passageway 218 adjacent to tube 42 being smaller than width $W_2$ of the, passageway 218 adjacent chamber 222. The chamber is shaped to receive further excess portions 224 of brake cable assembly 98 coupled to and integrally formed with excess portions 216 and 220 thereof. The chamber 222 is concave in this example in a direction facing the upper passageway 214 and the lower passageway 218. The chamber is larger in volume and cross-section width $W_3$ compared to the upper passageway 214 and compared to the lower passageway 218. As seen in FIG. 5, the chamber 222 is c-shaped in this embodiment.

Slack portion 109 of brake cable assembly 98 abuts at least in part the inner peripheral edge 204 of the outer portion 202 of its corresponding brake cable housing 168 when the walker apparatus 20 is its retracted position in this example; however this is not strictly required. The slack portion of the brake cable assembly forms an enlarged loop in the retracted position of the walker apparatus. The slack portion 109 of the brake cable assembly 98 extends at least in part between the outer peripheral edge 210 of the inner portion 208 of brake cable housing 168 and inner peripheral edge 204 of outer portion 202 of the brake cable housing when the walker apparatus 20 is in an intermediate position between the retracted position seen in FIG. 3 and the extended position seen in FIG. 2. As seen in FIG. 2, slack portion 109 of brake cable assembly 98 in this example abuts the outer peripheral edge 210 of the inner portion 208 of its corresponding brake cable housing 168 when the walker apparatus 20 is its extended position; however this is not strictly required.

The slack portion of the brake cable assembly forms a loop of a smaller size in the extended position of the walker apparatus seen in FIG. 2 compared to the size of the loop seen in FIG. 4 when the walker apparatus is in its retracted position. The slack portion 109 of brake cable assembly 98 thus forms a reduced loop shape spanning a planar area that is less than that of the enlarged loop shape when the apparatus is in its extended position. The brake cable housing 168 is thus shaped to enclose the slack portion 109 of the brake cable assembly within the chamber 222 thereof. Referring to FIG. 2, the height-adjustable assemblies 34 and 36 and brake cable housings 168 may collectively be referred to as a macro adjustment mechanism for altering the length/portion of the brake cable assembly 98 extending within the height-adjustable assemblies.

Referring to FIG. 5, the walker apparatus 20 includes a cable adjuster 229 positioned within chamber 222 and enclosed by the brake cable housing 168. The cable adjuster 168 may also be referred to as a tension adjuster or a tension-adjustment knob. The brake cable housing 168 is shaped to protect and to provide access to the cable adjuster 229. For example, the brake cable housing 168 may include an opening through which the cable adjuster 168 can be accessed and adjusted to alter a tension in the brake cable assembly 98. The brake cable housing 168 may also or alternatively include a latch which allows the brake cable housing 168 to be opened, allowing a user to adjust the cable adjuster 168 to alter a tension in the brake cable assembly 98. This may allow a user to easily adjust a tension in the brake cable assembly 98, without needing to adjust the brakes themselves, which are often awkwardly placed near floor level.

Figure 6:
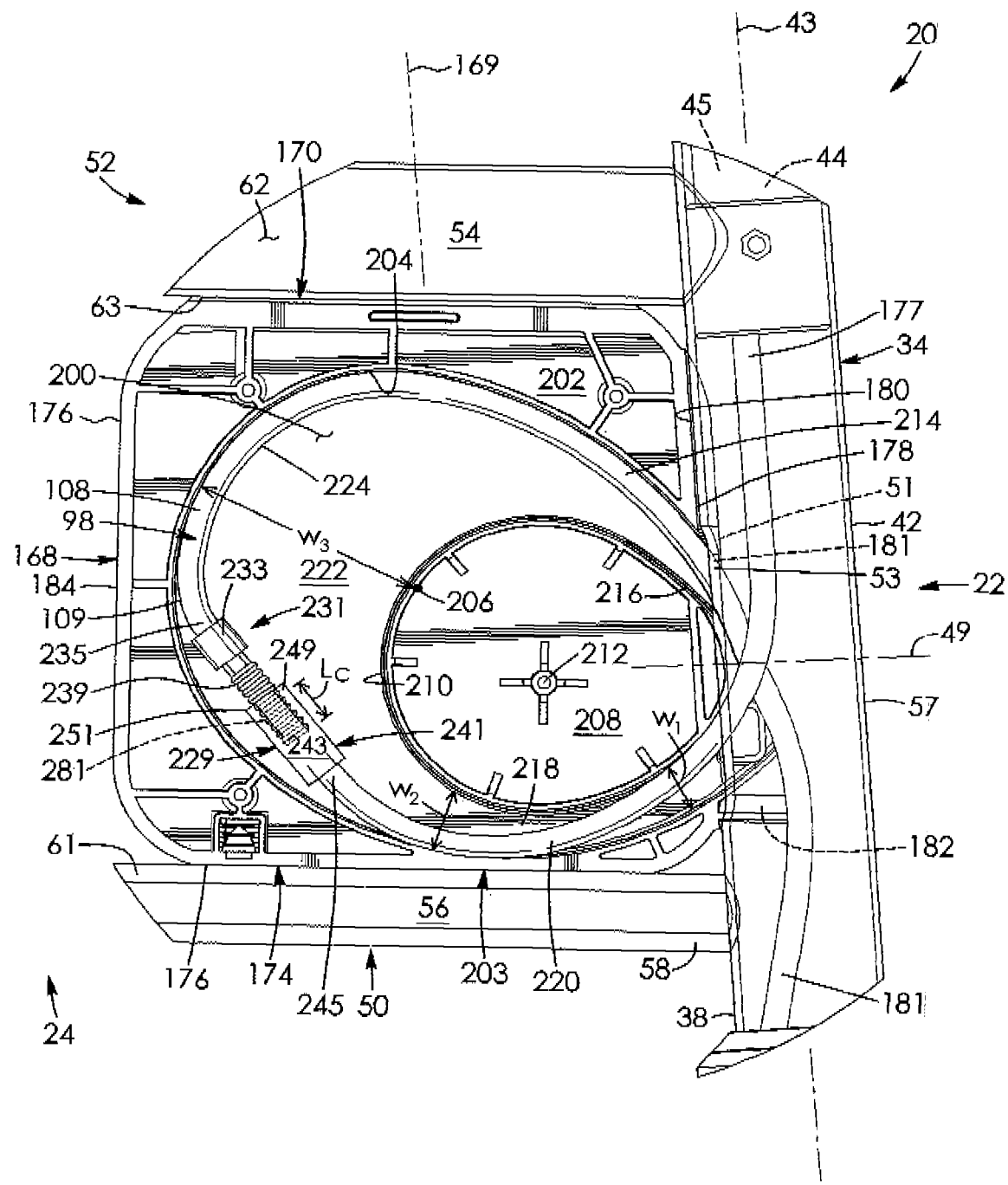
FIG. 6 is an inner side elevation view of the brake cable housing of FIG. 5, with the cable adjuster shown in an extended position, and the rest of the walker apparatus being shown in fragment and with transparent shading to reveal the interior components thereof

As seen in FIG. 6, the cable adjuster 229 comprises a first subassembly 231 including a first sleeve 233. The first sleeve 233 is shaped to receive and couple to a distal or upper end 235 of a first or lower segment 181 of the cable sleeve 108 of the brake cable assembly 98. The first subassembly 231 includes a male member, in this example a threaded tube 239 with exterior threading thereon. The threaded tube couples to and extends outwards from the sleeve 233.

As seen in FIG. 4, the cable adjuster 229 comprises a second subassembly 241 including a second sleeve 243. The second sleeve 243 is shaped to receive and couple to a proximal or lower end 245 of a second or upper segment 177 of the cable sleeve 108 of the brake cable assembly 98. As seen in FIG. 5, the cable adjuster 229 is inline with the cable sleeve of the brake cable assembly 98, and in this example inline with the slack portion 109 of the brake cable assembly. The cable adjuster 229 couples together upper segment 177 and lower segment 181 of the cable sleeve 108 of the brake cable assembly 98. Cable 100 extends through the cable adjuster 229. One of the sleeves 233 and 243 of the cable adjuster 229 is rotatable ready to its corresponding segment of brake cable assembly 98, in this example sleeve 243.

The second subassembly 241 includes a female member, in this example a nut 249 coupled to, integrally formed with and extending outwards from the second sleeve 247. However, this is not strictly required: instead of being referred to as a nut, the second subassembly 241 may be said to comprise sleeve 243 having internal threading extending inwards from one end 251 thereof. The nut 249 threadably couples to and receives the threaded tube 239.

The cable adjuster 229 has a retracted position seen in FIGS. 4 and 5 in which the threaded tube 239 is fully inserted into and threadably coupled with the nut 249. Rotation of the nut relative to the threaded tube enables the cable adjuster to move from its retracted position seen in FIG. 5 to an tended position seen in FIG. 6. Only the distal end 281 of the threaded tube 239 threadably couples with and is inserted into the nut 249 when the cable adjuster is in its extended position. Positioning of the upper segment 177 of the cable sleeve 108 of the brake cable assembly 98 relative to the lower segment 181 of the cable sleeve of the brake cable assembly may thus be adjusted to by a desired extension or length $L_C$. The cable sleeve of the brake cable assembly may therefore be selectively effectively lengthened by up to length $L_C$ via the cable adjuster 229. Threaded adjustment of the nut along the threaded tube alters the effective length of the cable sleeve 108 of the brake cable assembly 98. Actuation of the cable adjuster thus alters the effective length of the cable sleeve of the brake cable assembly and the cable adjuster may be said to comprise a micro adjustment mechanism for the brake cable assembly 98. Referring to FIGS. 5, and 9, the position of the end point of the cable relative to the brake pad 215 changes by actuating the cable adjuster 229 as spring 217 is continuously applying a pressure to the cable. Tension adjustment may thus occur via the inline nut The cable adjuster 229 can be used to compensate for at least two problems which may otherwise arise in a brake cable assembly 98 for a walker apparatus 20. First, over the course of time, the cable 100 may gradually elongate. The cable adjuster 229 may be used to compensate for this gradual elongation and may therefore improve the operation of the walker apparatus 20 and its brake cable assembly 98. Second, over the course of time the brake pad 215 contact surface may wear, and the cable adjuster 98 can be used to compensate for the gradual loss of this contact surface to improve the operation of the brakes. The cable adjuster 229 may also offer convenient access to the brake adjustment mechanisms, as it may be placed in the covered brake cable housing 168 at a relatively accessible height, while other brake adjustment mechanisms may be placed almost at floor level—an inconvenient height for a user to access and adjust the brakes of their walker apparatus 20 or other height-adjustable wheeled vehicle.

As seen in FIG. 6, the slack portion 109 of the brake cable assembly 98 is configured to abut in part the peripheral edge 204 of the outer portion 202 of the brake cable housing 168 when the height-adjustable assembly 34 is in a retracted position and the cable adjuster 229 is in an extended position in this example. As seen in FIG. 2, the slack portion of the brake cable assembly is configured to abut in part the peripheral edge 210 of the inner portion of the brake cable housing 168 when the height-adjustable assembly is in an extended position and the cable adjuster is in a retracted position.

Figure 14:
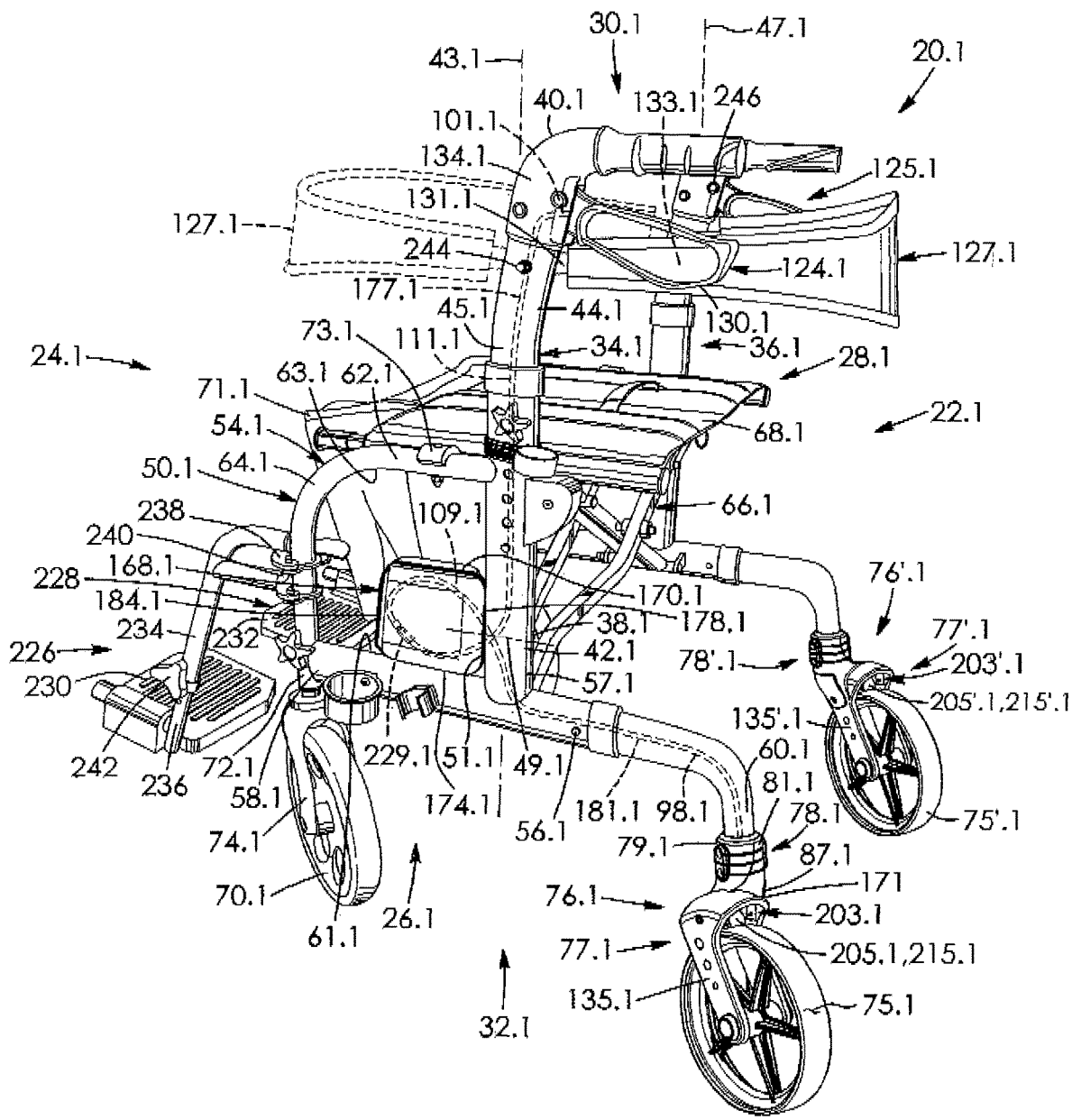
FIG. 14 is a right-side, rear perspective view of a manually operated, height-adjustable wheeled vehicle according to a second aspect, the vehicle comprising a combination transport chair and walker apparatus.

FIG. 14 shows a manually operated, height-adjustable wheeled vehicle, in this example a combination transport chair and walker apparatus 20.1 according to a second embodiment. Like parts have like numbers and functionings as the embodiment shown in FIGS. 1 to 13 with the addition of "0.1". Apparatus 20.1 is substantially the same as apparatus 20 seen in FIGS. 1 to 13 with the following exceptions.

The apparatus 20.1 includes a pair of footrest assemblies 226 and 228. The footrest assemblies include footrests 230 and 232 that are positioned along the front 24.1 and bottom 32.1 of the apparatus, with footrest 230 being adjacent to side 26.1 and footrest 232 being adjacent to side 28.1. The footrests are planar and rectangular in shape in this example and are shaped to receive respective feet of a person who is sitting on seat assembly 68.1 while sitting facing the front of the apparatus 20.1.

Each of the footrest assemblies 226 and 228 includes length-adjustable framing, in this example in the form of telescoping tubes 234 and 236. Outer tube 234 selectively couples to its respective laterally extending assembly 50.1 via a coupling mechanism, in this example clamps 238 and 240 that extend about curved portion 64.1 of tube 54.1. Inner tube 236 couples to footrest 230 and is received in part within the outer tube. Each of the footrest assemblies 226 and 228 includes an adjustable mechanism, in this example a thumb screw 242. Loosening of the thumb screw enables inner tube 236 to be rotatable relative to outer tube 234 and enables the extent to which the inner tube extends outwards from the outer tube to be adjustable. When a desired length of tubing and angular position of the footrests 230 is obtained, the thumb screw 242 is tightened to couple the inner and outer tubes together.

The apparatus 20.1 has a transportation chair mode shown with the backrest 127.1 in solid lines and in a transport-chair-mode position, The backrest in this position extends from its ends 131.1 and 133.1 towards the rear 22.1 of the apparatus. The backrest 127.1 includes a pair of adjustment mechanisms 244 and 246 adjacent to the ends 131.1 and 133.1 thereof. The thumb screws when loosened enable the backrest to move from the transport-chair-mode position to a walker-mode position seen by the positioning of the backrest in ghost lines. The backrest 127.1 in this position extends from its ends 131.1 and 133.1 towards the front 24.1 of the apparatus 20.1. When the desired backrest position is achieved, the thumb screws are tightened to inhibit rotation of the backrest relative to the height-adjustable assemblies 34.1 and 36.1 thereafter. Apparatus 20.1 thus can be a transportation chair at times arid a walker apparatus at times. Thus, the apparatus can be configured as a transport chair or walker apparatus. Apparatus 20.1 is in part a transport chair may thus also be referred to as transport chair.

Lower side frame member, in this example tube 56.1 is J-shaped and has wheels 70.1 and 75.1 operatively connected thereto at distal ends 58.1 and 60.1 thereof. Upright assemblies 34.1 and 36.1 are positioned between the front 24.1 and the rear 22.1 of the apparatus 20.1 in this example.

Tube 42.1 couples and extends upwards from tube 56.1. Tubes 42.1, 44.1 and 56.1 are similar in diameter in this example, with tubes 54.1 being smaller in diameter compared thereto.

Bottom 174.1 of brake cable housing 168.1 couples to and abuts top 61.1 of frame member 56.1 in this example. Elongate rear 178.1 of the brake cable housing couples to and abuts the outer tube 42.1 adjacent to frame member 56.1 in this case. Substantially straight portion 62.1 of tube 54.1 is spaced-apart above of the brake cable housing 168.1 in this example and curved portion 64.1 of the tube is positioned forward of the brake cable housing 168.1.

Figure 15:
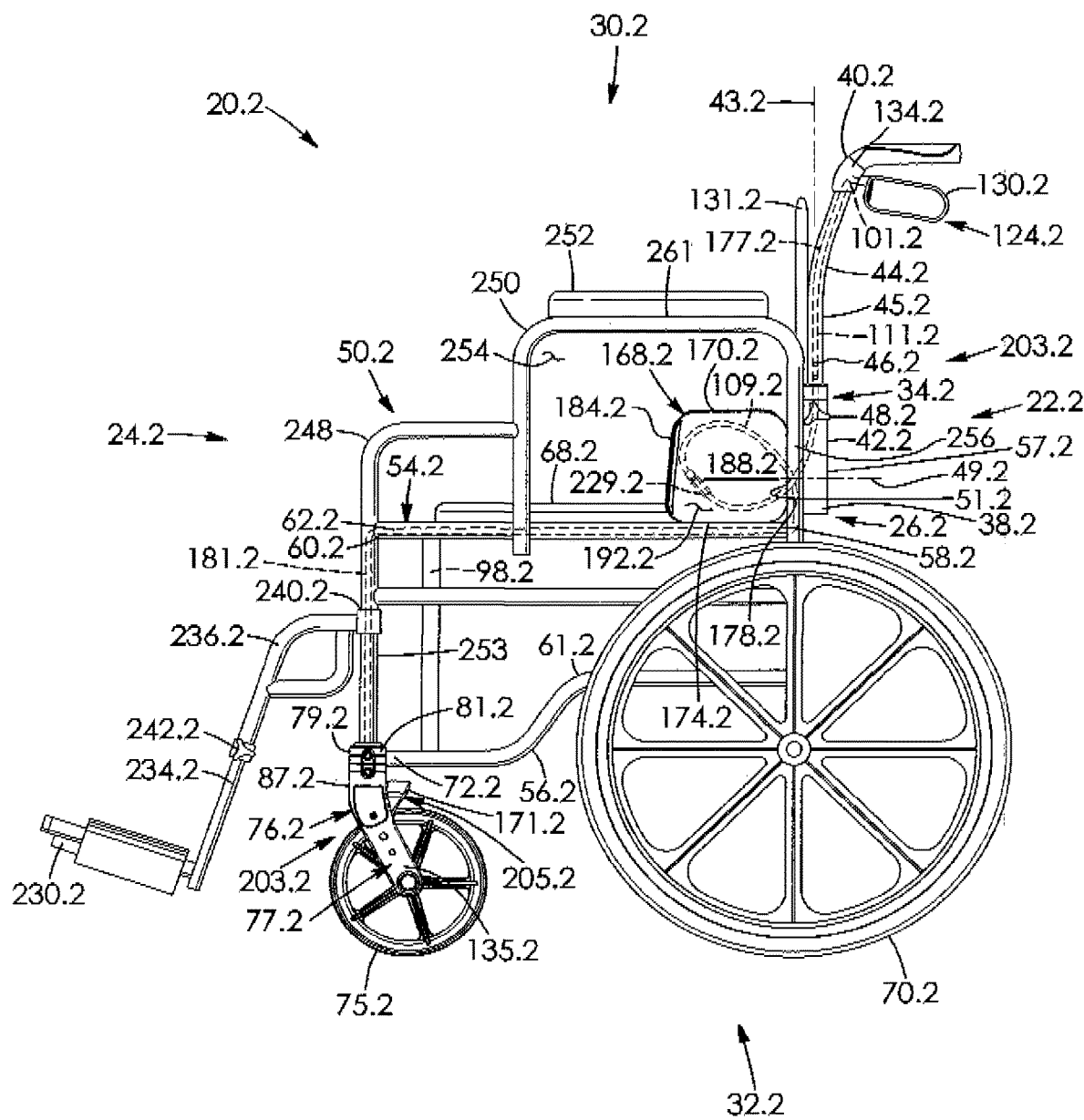
FIG. 15 is a right-side elevation view of a manually operated, height-adjustable wheeled vehicle according to a third aspect, the vehicle comprising a wheelchair.

FIG. 15 shows a manually operated, height-adjustable wheeled vehicle, in this example a wheelchair 20.2 according to a third embodiment. Like parts have like numbers and functionings as the embodiment shown in FIGS. 1 to 13 with the addition of "0.2". Apparatus 20.2 is substantially the same as apparatus 20 seen in FIGS. 1 to 13 with the following exceptions.

The wheelchair has a pair of spaced-apart front wheels 75.2 to which brake assemblies 203.2 are coupled and a pair of spaced-apart, enlarged, hand-propelled rear wheel 70.2. The wheelchair 20.2 includes a pair of spaced-apart height-adjustable assemblies 34.2 to which corresponding gripping handles 130.2 pivotally couple at upper ends 40.2 of the height-adjustable assemblies.

The wheelchair includes various u-shaped frames 248 and 250 per laterally extending assembly 50.2 in this example. Armrests 252 couple to and extend along the tops 261 of respective ones of frames 250. The frames 248 and 250 couple to and extend upwards from tube 54.2 in this example. The wheelchair 20.2 includes brake assemblies 203.2 for its front wheels 75.2, with a brake cable housing 168.2 per side thereof. Each brake cable housing is position within the square-shaped opening 254 formed by corresponding frame 250 and tube 54.2 in this example. Bottom 174.2 of the brake cable housing 1682 couples to tube 54.2 and rear 178.2 of the brake cable housing couples to upright portion 256 of frame 250 in this example.

The wheelchair includes an upright backrest 131.2 which couples to the upright portion of frame 250 in this example. Tubes 42.2 of the height-adjustable assemblies 34.2 also couple to frame 250 in this example. The wheelchair 20.2 includes a vertically extending hollow frame member, in this example tube 253 per side thereof, with the tube extending between tubes 54.2 and 56.2 in this example.

Brake cable assembly 98.2 is positioned within the framing of the wheelchair 20.2, in this example within tubes 44.2, 42.2, 54.2, and 253, with slack portion 109.2 of the brake; cable assembly being enclosed within the brake cable housing 168.2 in a like manner as described previously. The brake cable housing 168.2 is shaped to accommodate varying amounts of excess portions of the brake cable assembly as the vertical positioning of the gripping handles 130.2 is adjusted by the user as needed.

Figure 16:
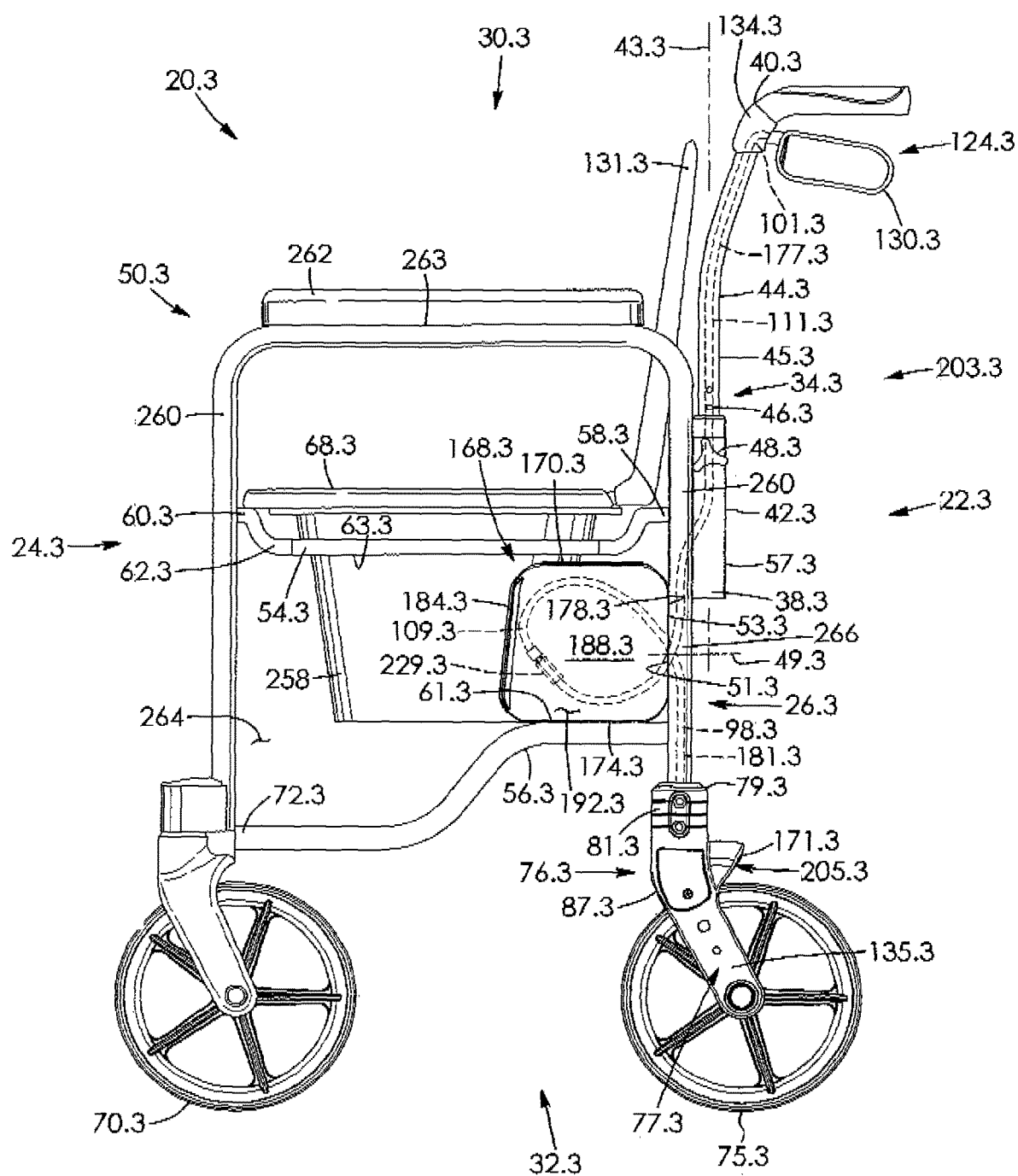
FIG. 16 is a right-side elevation view of a manually operated, height-adjustable wheeled vehicle according to a fourth aspect, the vehicle comprising a wheeled commode.

FIG. 16 shows a manually operated, height-adjustable wheeled vehicle, in this example a wheeled commode, shown by number 20.3, according to a fourth embodiment. Like parts have like numbers and functionings as the embodiment shown. in FIGS. 1 to 13 with the addition of "0.3". Apparatus 20.3 is substantially the same as apparatus 20 seen in FIGS. 1 to 13 with the following exceptions.

The commode has a pair of spaced-apart front wheels 70.3 and a pair of spaced-apart rear wheel 75.3. The commode 20.3 includes a pair of spaced-apart height-adjustable assemblies 34.3 to which gripping handles 130.3 pivotally couple at upper ends 40.3 of the height-adjustable assemblies. The commode includes a chamber pot 258 which couples to and extends downwards from seat 68.3 thereof. The commode includes an upright backrest 1313 which couples to and extends upwards from the seat. The commode 20.3 includes a u-shaped frame 260 per laterally extending assembly 50.3 in this example, Armrests 262 couple to arid extend along the tops 263 of respective ones of the frames. Each frame 260 couples to and extends upwards from a respective tube 56.3. Tube 54.3 is positioned between tube 56.3 and top 263 of the frame in this example and couples to and extends between the frame.

The commode 20.3 includes brake assemblies 203.3 to selectively brake wheels 703 in this example. Each brake assembly includes a brake cable housing 168.3 positioned within the opening 264 formed by frame 260 and tubes 54.3 and 56.3 in this example. Bottom 174.3 of the brake cable housing couples to the top 61.3 of tube 56.3 in this example. Rear 178.3 of the brake cable housing 168.3 couples to upright portion 266 of frame 260 in this example. Tubes 42.3 of the height-adjustable assemblies 34.3 couple to the upright portions 266 of frames 260 in this example.

Brake cable assembly 98.3 is positioned within the framing of the commode 20.3, with tubes 42.3, 44.3 and 56.3 extending therearound. Slack portion 109.3 of the brake cable assembly is enclosed within the brake cable housing 1683 in a like manner as described previously. The brake cable housing is shaped to accommodate varying amounts of excess portions of the brake cable assembly as the vertical positioning of the gripping handles 130.3 is adjusted by the user as needed. Actuation of gripping handle 130.3 causes the brake cable assembly 98.3 to 3 to selectively engage and the brake wheels 753. This functions to inhibit movement of the commode in a like manner as previous described above.

Figure 17:
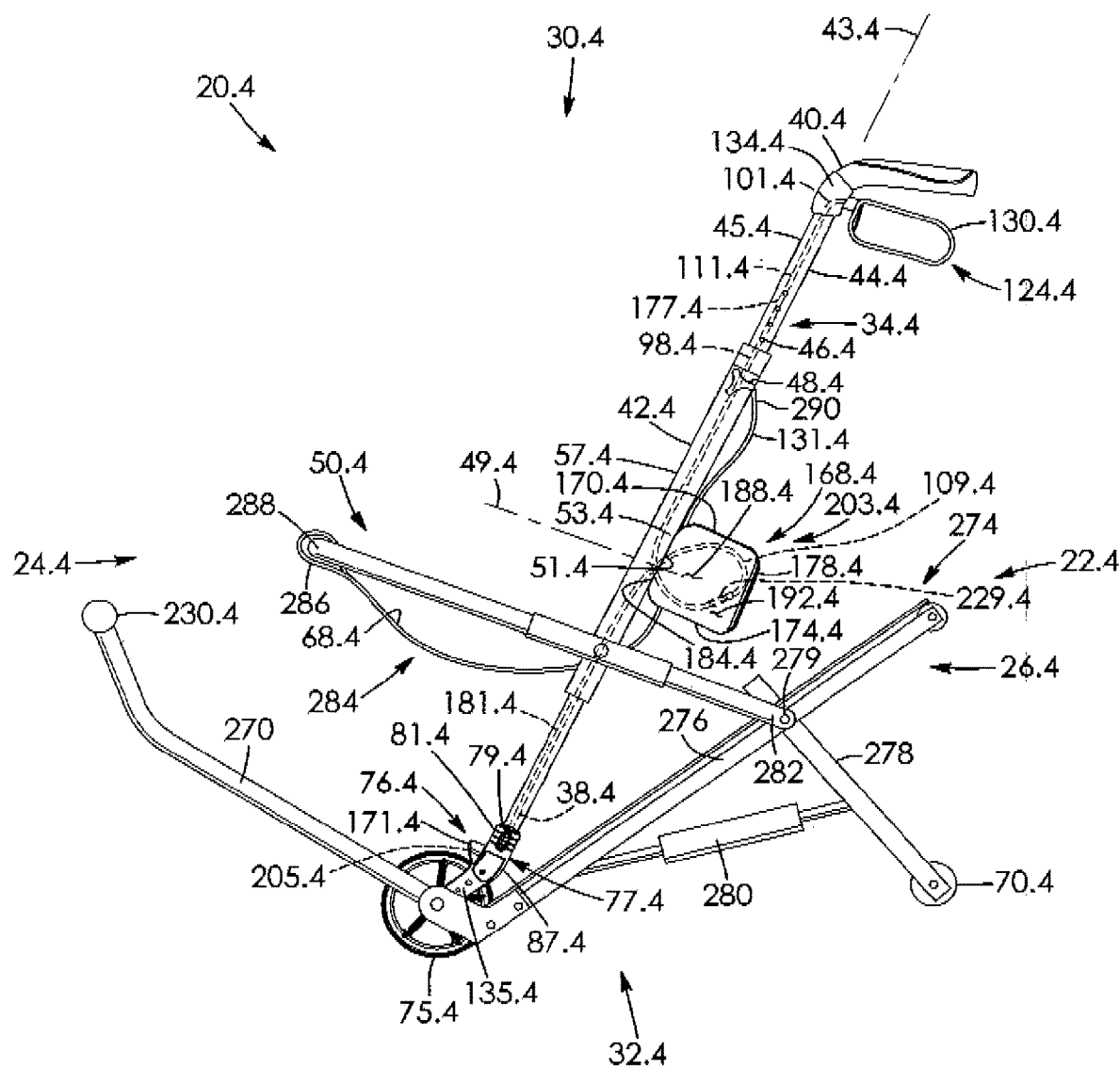
FIG. 17 is a right-side elevation view of a manually operated, height-adjustable wheeled vehicle according to a fifth aspect, the vehicle comprising an evacuation chair.

FIG. 17 shows a manually operated, height-adjustable wheeled vehicle, in this example an evacuation chair 20.4 according to a fifth embodiment. Like parts have like, numbers and functionings as the embodiment shown in FIGS. 1 to 13 with the addition of "0.4". Apparatus 20.4 is substantially the same as apparatus 20 seen in FIGS. 1 to 13 with the following exceptions.

The evacuation chair includes a pair of spaced-apart front wheels 75.4 and a pair of spaced-apart rear wheel 70.4. The evacuation chair 20.4 includes a pair of height/length-adjustable assemblies at adjacent sides thereof and to which respective laterally extending assemblies pivotally connect. This is shown by height-adjustable assembly 34.4 pivotally connecting with laterally extending assembly 50.4 between the lower end 38.4 and upper end 40.4 thereof Front wheels 75.4 are rotatably mounted to the height-adjustable assemblies upright 34.4 adjacent to the lower ends thereof. A foot-support, in this example in the form of u-shaped frame 270, seen in side profile, pivotally couples to front wheels 75.4 and is extendable outwards from lower ends 38.4 of the height-adjustable assemblies upright 34.4.

The evacuation chair 20.4 includes a pair of wheel folding assemblies 274 per side thereof. Each folding assembly includes a pair of base frame members 276 and 278 that pivotally couple together via axle 279. Front wheels 75.4 rotatably couple to respective base frame members 276. Rear wheels 70.4 rotatably mount to base frame members 278. Each folding assembly includes in this example a hydraulic actuator 280 that pivotally connects to and couples together base frame member 278 and front wheel 75.4. Rear, end 282 of laterally extending assembly 50.4 pivotally couples to axle 279 in this example. The folding mechanisms foot support, height-adjustable assemblies and laterally extending assemblies of the evacuation chair 20.4 are configured to selectively fold upon themselves to form a compact form when the evacuation chair is not needed. Evacuation chairs per se, including their various parts and functionings, are well known to those skilled in the art and details regarding folding mechanisms in this regard will thus not be described in further detail.

The evacuation chair 20.4 includes a flexible member 284 with a bottom portion in the form of a seat 68.4 and an upright portion in the form of backrest 131.4. The flexible member extends between the sides 284 of the evacuation chair with a lower end 286 extending about and coupled to distal ends 288 of the laterally extending assemblies 50.4 in this example. An upper end 290 of the flexible member 284 couples to the height-adjustable assemblies 34.4 at a location adjacent to thumb screw 48.4 in this example.

The evacuation chair 20.4 includes brake assemblies 203.4 with brake members 205.4 mounted to the height-adjustable assemblies 34.4 adjacent to the front wheels 70.4 of the evacuation chair. The brake assemblies include a brake cable housing 168.4 per: side thereof. The front 184.4 of each brake cable housing couples to and extends along a respective tube 42.4 of its corresponding height-adjustable assembly 34.4 in this example.

Brake cable assembly 98.4 is positioned within the framing of the evacuation chair 20.4, in this example within tubes 44.4 and 42.4, with slack portion 109.4 of the brake cable assembly being enclosed within the brake cable housing 168.4 in a like manner as described previously. The brake cable housing is shaped to accommodate varying amounts of excess portions of the brake cable assembly as the positioning of the, gripping handles 130A is adjusted by the user as needed. Actuation of the gripping handle causes the brake cable assembly 98.4 to move brake member 205.4 so as to selectively engage and brake front wheel 75.4. This functions to inhibit movement of the evacuation chair 20.4 in a like manner as previous described above.

Figure 18:
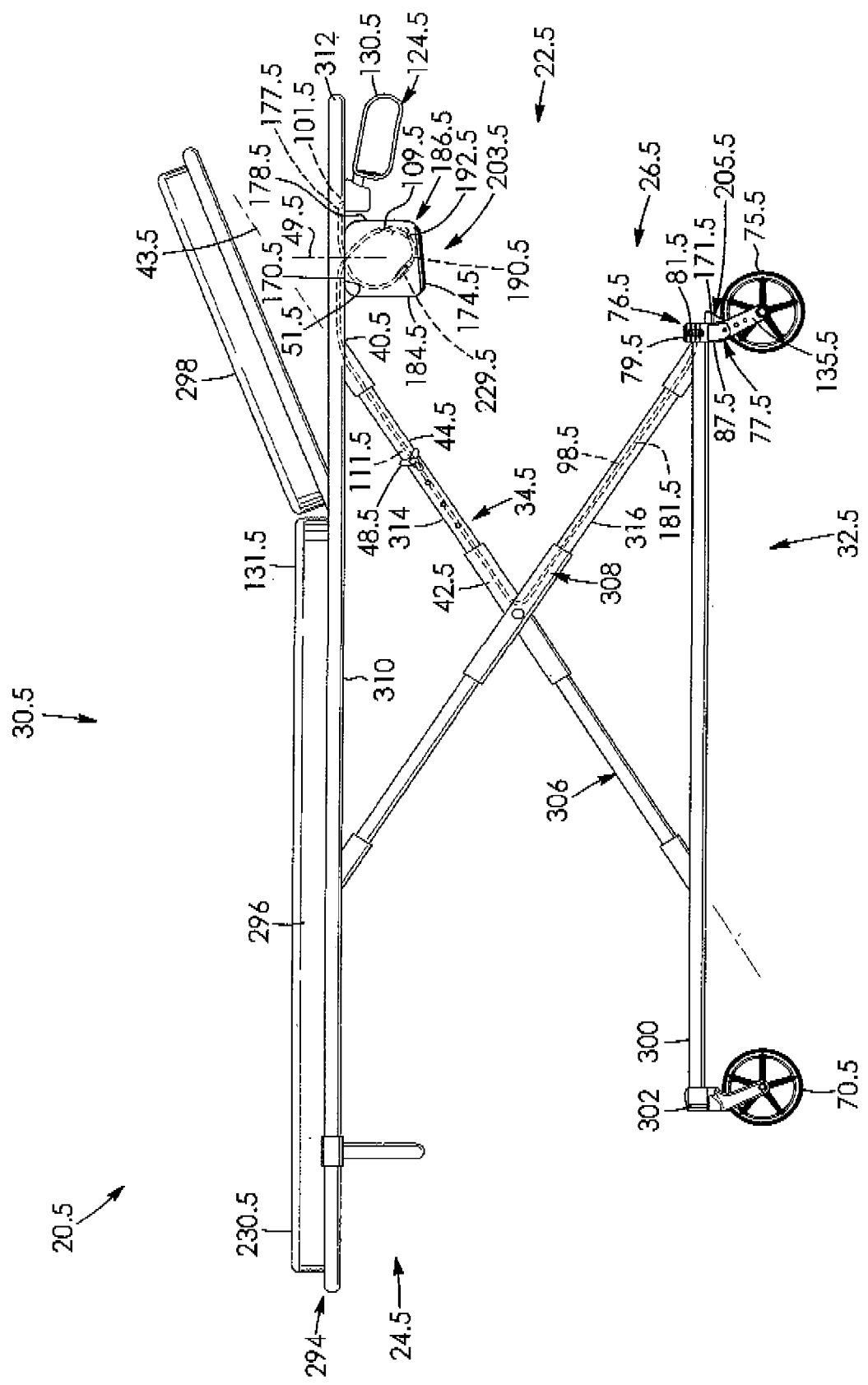
FIG. 18 is a right-side elevation view of a manually operated, height-adjustable wheeled vehicle according to a sixth aspect, the vehicle comprising a height-adjustable stretcher.

FIG. 18 shows a manually operated, height-adjustable wheeled vehicle, in this example a height-adjustable stretcher 20.5 according to a sixth embodiment. Like parts have like numbers and functionings as the embodiment shown in FIGS. 1 to 13 with the addition of "0.5". Apparatus 20.5 is substantially the same as apparatus 20 seen in FIGS. 1 to 13 with the following exceptions.

The stretcher includes a horizontally extending upper platform 294 upon a body mattress 296 and head cushion 298 couple and extend in this example. The stretcher 20.5 includes a base, in this example a base frame assembly 300 to which front wheels 70.5 rotatably mount at a forward end 302 thereof and to which rear wheels 75.5 mount at a rearward end 304 thereof. The stretcher includes a height-adjustment mechanism 34.5 which in this example comprises a pair of crossed-linking telescoping assemblies 306 and 308 that are hollow in this example. The telescoping assemblies pivotally couple to and extend between platform 294 and base frame assembly 300. Height-adjustment mechanisms for stretchers, including their various parts and functionings, are known per se and thus will not be described in further detail. The stretcher 20.5 includes a pair of gripping handles 130.5 that pivotally couple to the bottom. 310 of platform 294 in this example adjacent to the rearward end 312 of the platform.

The stretcher includes brake assemblies 203.5 to selectively brake wheels 75.5 in this example. Each brake assembly includes a brake cable housing 168.5. In this example the top 170.5 of each brake cable housing couples to and extends along the bottom. 310 of the platform 294 adjacent to the rearward end 312 of the platform.

Brake cable assembly 98.5 is positioned within the framing of the stretcher 20.5, in this example extending within platform 294, rearward tubing 314 telescoping assembly 306 and rearward tubing 316 of telescoping assembly 308; however this is not strictly required and the brake cable assembly may extend along the outside thereof in other embodiments. Slack portion 109.5 of the brake cable assembly is enclosed within the brake cable housing 168.5 in a like manner as described previously. The brake cable housing is shaped to accommodate varying amounts of excess portions of the brake cable assembly as the height of the stretcher is adjusted as needed. Actuation of gripping handle 130.5 causes the brake cable assembly 98.5 to move brake member 205.5 to selectively engage and brake rear wheels 70.5. This functions to inhibit movement of the stretcher in a like manner as previous described above.

FIGS, 19 to 20 show a manually operated, height-adjustable wheeled vehicle, in this example a walker apparatus 20.6 according to a seventh embodiment. Like parts have like numbers and functionings as the embodiment shown in FIGS. 1 to 13 with the addition of "0.6". Apparatus 20.6 is substantially the same as apparatus 20 seen in FIGS. 1 to 13 with the following exceptions.

Figure 19:
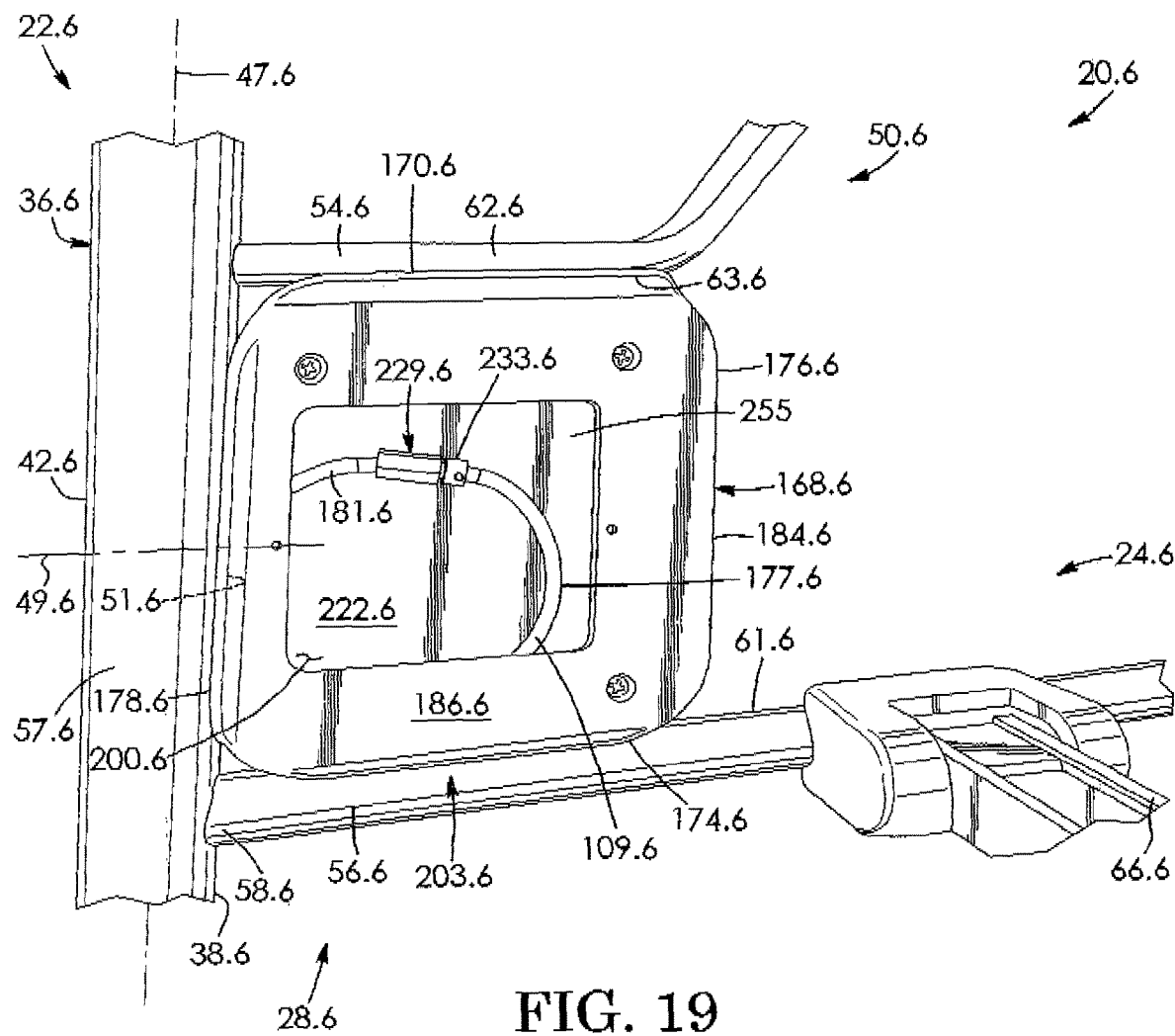
FIG. 19 is an inner side elevation view of a manually operated, height-adjustable wheeled vehicle according to a seventh aspect, the vehicle comprising a walker apparatus similar to FIG. 1 with each brake cable housing thereof having an access port for selectively accessing a cable adjuster of the brake cable assembly thereof, and with the height-adjustable assembly, side framing and folding mechanism of the walker apparatus being shown in fragment.

As seen in FIG. 19, the brake cable housing 168.6 has an access port 255 extending through the inner side planar portion, in this example inner side 186.6 thereof The access port is in communication with the chamber 222.6 and interior space 200.6 of the brake cable housing. The placement of the access port 255 may allow a user to adjust a cable adjuster 229.6.

Figure 20:
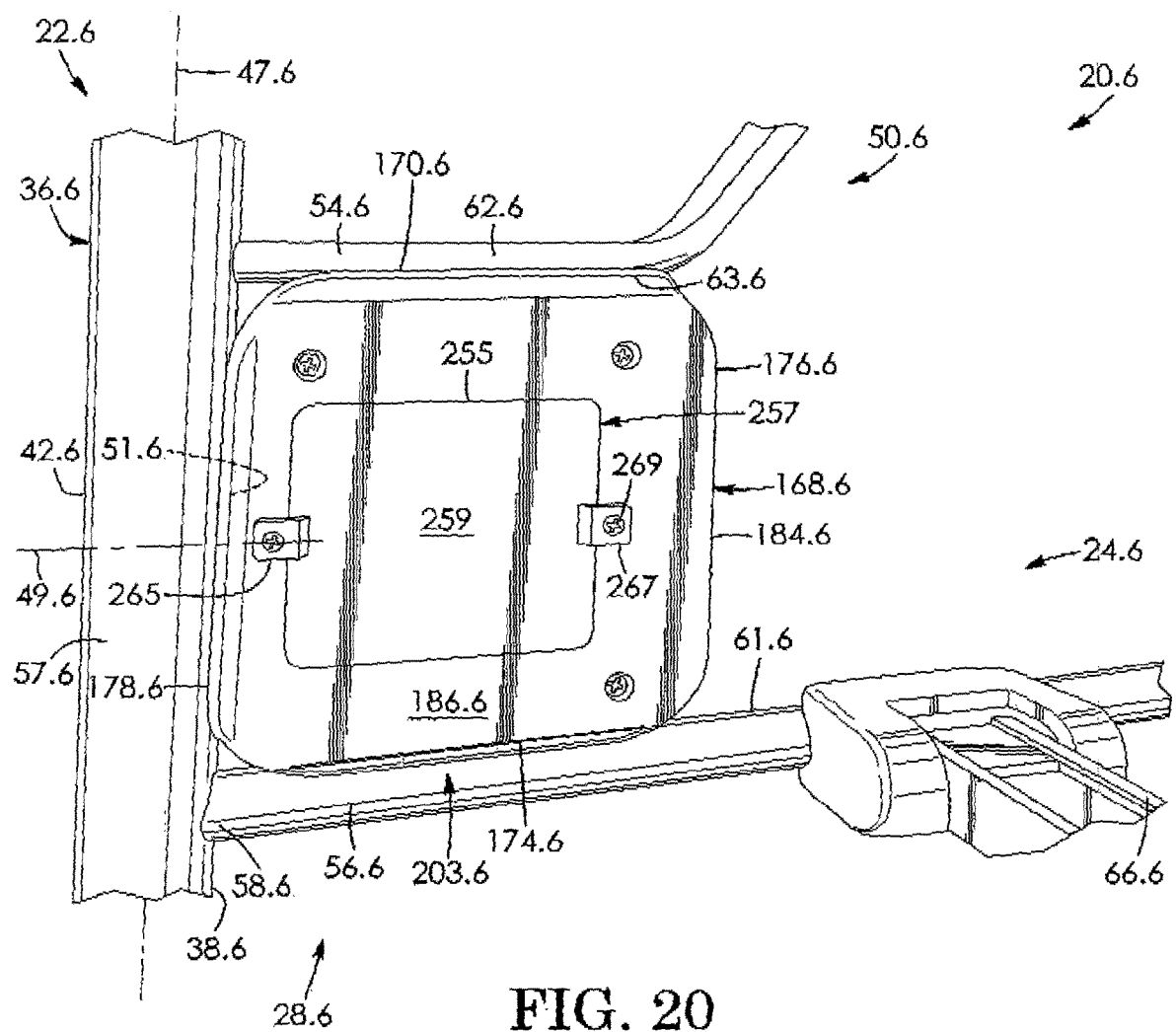
FIG. 20 is an inner side elevation view of the walker apparatus of FIG. 19, with a removable cover of the brake cable housing thereof shown extending across and covering the access port of FIG. 19, and with the height-adjustable assembly, side framing and folding mechanism of the walker apparatus being shown in fragment.

As seen in FIG. 20, the brake cable housing 168.6 includes a removable cover 257 which extends across the access port 255. The removable cover includes a planar portion 259 that is rectangular in this example. The removable cover 257 includes a pair of spaced-apart tabs .265 and 267 which are integrally formed with the planar portion thereof in this example. The tabs couple to and extend outwards from the planar portion 259. The removable cover 257 threadably couples to the inner side 186.6 of the brake cable housing 168.6 via fasteners, in this example bolts 269 which extend through the tabs. The interior space 200.6 of the brake cable housing seen in FIG. 19 is thus accessible by selectively removing the cover seen in FIG. 20. As seen in FIG. 20, the peripheral portion 276.6 of the brake cable housing 168.6 is outwardly spaced from and extends about the removable cover 257. The removable cover is smaller in span compared ,to the inner side 186.6 of the brake cable housing 168.6 in this example. The removable cover may also be removably attached to the brake cable housing using other mechanisms, such as being secured in place using a latch.

Figure 21:
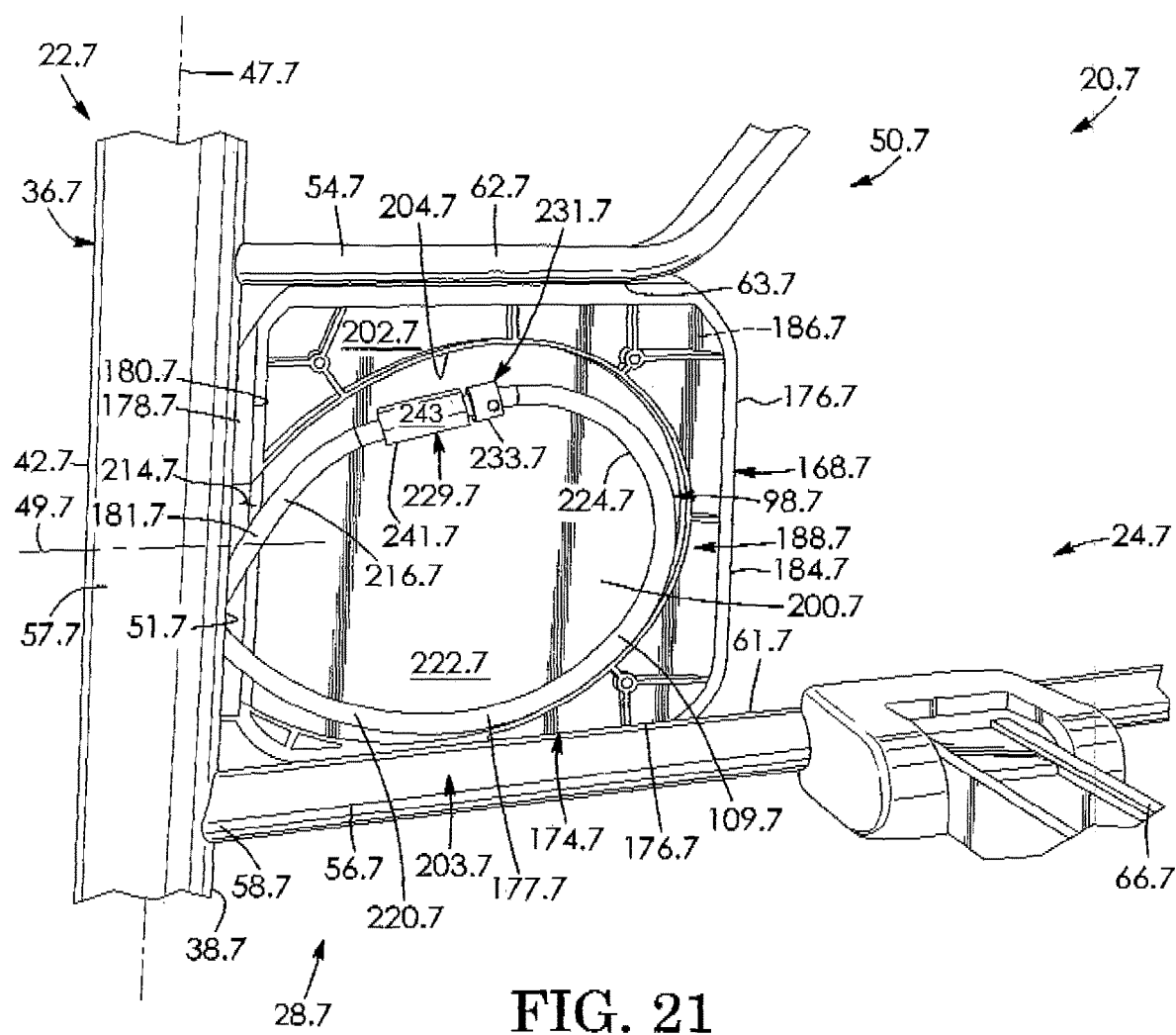
FIG. 21 is an inner side elevation view of a manually operated, height-adjustable wheeled vehicle according to an eighth aspect, the vehicle comprising a walker apparatus similar to FIG. 19 with one brake cable housing thereof being shown partially unassembled to reveal a chamber thereof, and with the height-adjustable assembly, side framing and folding mechanism of the walker apparatus being shown in fragment.

FIG. 21 shows a manually operated, height-adjustable wheeled vehicle, in this example a walker apparatus 20.7 according to an eighth embodiment. Like parts have like numbers and functionings as the embodiment shown in FIGS. 1 to 13 with the addition of "0.7". Apparatus 20.7 is substantially the same as apparatus 20 seen in FIGS. 1 to 13 with the following exceptions.

The brake cable housing 168.7 has a single opening or passageway 214.7 in this embodiment in communication with aperture 51.7. The excess or slack portion 109.7 of the brake cable assembly 98.7 extends into the chamber 222.7 via the passageway of the brake cable housing. The chamber is defined by and spans between inner wall or peripheral edge 204.7, which is arc-shaped, and the inner side 186.7 and outer side 188.7 of the brake cable housing 168.7. There is no inner portion or inner peripheral edge to the brake cable housing such as the inner portion 208 and peripheral edge 210 of brake cable housing 168 shown in FIG. 4. Referring back to FIG. 21, the slack portion 109.7 of the brake cable assembly 98.7 is thus movable anywhere within the chamber 222.7.

Figure 22:
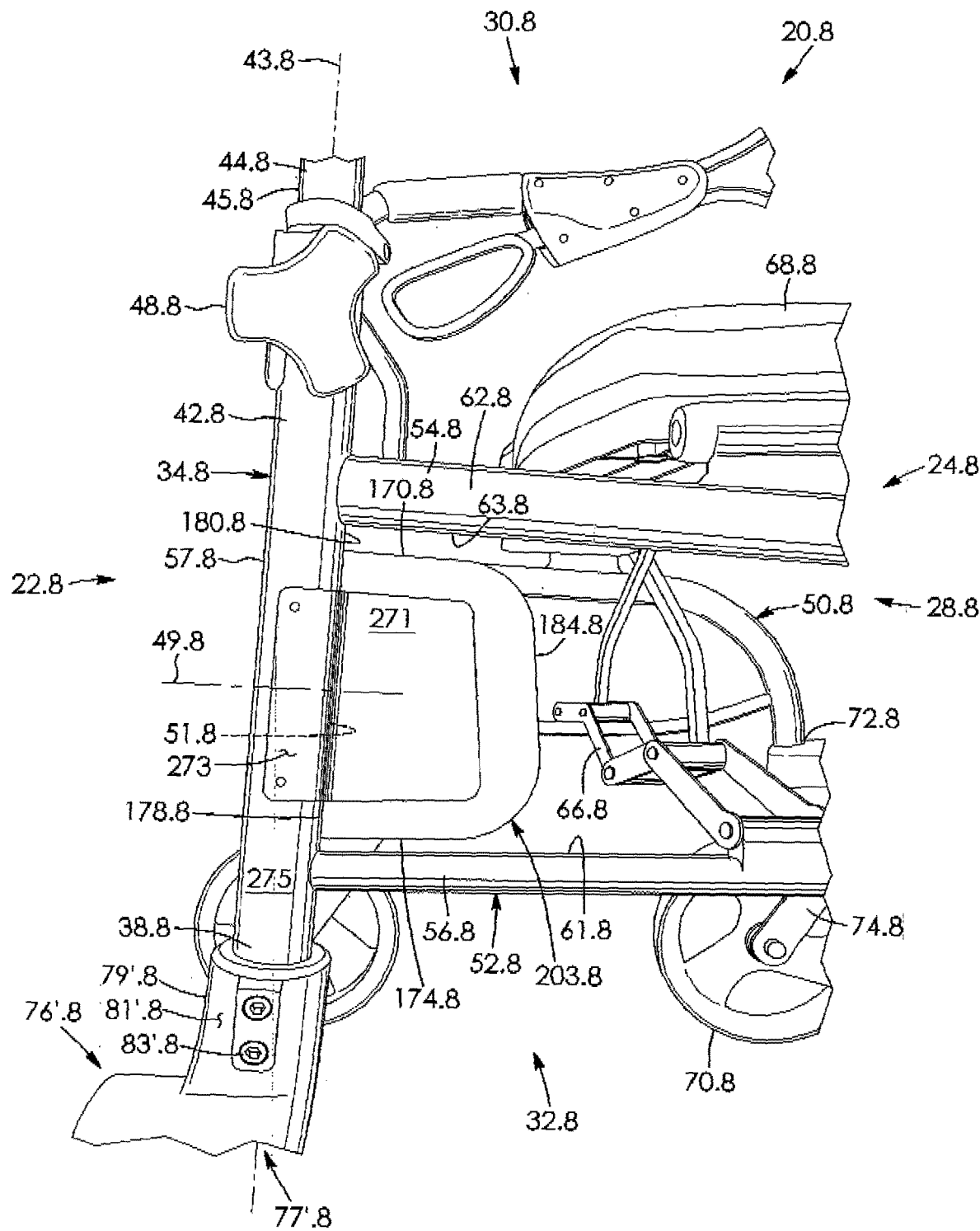
FIG. 22 is a left side elevation view of a manually operated, height-adjustable wheeled vehicle according to a ninth aspect, the vehicle comprising a walker apparatus similar to FIG. 1, with the apparatus including connectors which couple the brake cable housings thereof to the height-adjustable assemblies thereof, and with the walker apparatus being shown partially in fragment.

FIG. 22 shows a manually operated, height-adjustable wheeled vehicle, in this example a walker apparatus 20.8 according to an eighth embodiment. Like parts have like numbers and functionings as the embodiment shown in FIGS. 1 to 13 with the addition of "0.8". Apparatus 20.8 is substantially the same as apparatus 20 seen in FIGS. 1 to 13 with the following exceptions.

The brake cable housing 168.8 is spaced-apart from the one or more side frame members, in this example tubes 54.8 and 56.8 in this embodiment. The brake cable housing abuts front portion 180.8 of the height-adjustable assembly 34.8, in this example tube 42.8.

The walker apparatus 20.8 includes a connector, in this example a coupling plate 271 that is planar and rectangular in this example. The coupling plate extends outwards from the rear 178.8 of the brake cable housing 168.8. The coupling plate 271 includes an arc-shaped portion 273 which couples to, receives in part and abuts a side portion 275 of the height-adjustable assembly 34.8, in this example tube 42.8.

In one aspect, a wheel fork assembly for a manually operated, height-adjustable wheeled vehicle, the vehicle including a frame member, is described. The wheel fork assembly includes a mount shaped to couple with a lower end of the frame member, the mount having a longitudinal axis; and a wheel fork having a longitudinal axis offset from the longitudinal axis of the mount and being integrally coupled to and formed with said mount. The wheel fork may include an inner planar portion of the wheel fork which aligns with the longitudinal axis of the mount. The wheel fork may include a mount which is tubular at least in part.

In one aspect, a wheel fork assembly for a manually operated, height-adjustable wheeled vehicle, the vehicle including a frame member, is described. The wheel fork assembly includes a mount including an upper portion shaped to couple with a lower end of the frame member and a lower portion that curves laterally outwards; and a wheel fork coupled to the lower portion of the mount.

The wheel fork assembly may have outer and inner sides, and each said side may be outwardly concave in part and outwardly convex in part. The wheel fork assembly may have a mount with an outer side and an inner side, with the lower portion of the mount being outwardly concave at said outer side and being outwardly convex at said inner side. The upper portion of the mount may be tubular. The wheel fork may be shaped to. receive a wheel therebetween such that the wheel is forward facing and laterally outwardly spaced from the frame member of the vehicle.

In one aspect, a wheel fork assembly for a manually operated, height adjustable wheeled vehicle is described. The wheel fork assembly includes a pair of elongate supports having lower portions between which a wheel is mountable and having upper portions, an aperture extending through the upper portion of one said support; an upper cover which couples together the upper portions of the supports; and a side cover that extends across said aperture and which is selectively removable.

The wheel fork assembly may be on a vehicle which includes a wheel-engaging brake member and a brake adjustment mechanism, where the upper cover and the upper portions of the supports extend about the wheel-engaging brake member and the brake adjustment mechanism, wherein the aperture is in communication with the brake adjustment mechanism, and wherein removal of the side cover provides access to the brake adjustment mechanism. The wheel fork assembly may include an upper portion of the one support which includes a pair of flanges between which said aperture extends. The wheel fork assembly may further include a fastener, the side cover coupling to the one said support via said fastener.

In one aspect, a wheel fork assembly for a manually operated, height-adjustable wheeled vehicle, the vehicle including a wheel-engaging brake member and a brake adjustment mechanism, is described. The wheel fork assembly includes a pair of elongate supports between which a wheel is received and to which the wheel rotatably couples; and a housing which couples together the supports and extends about the wheel-engaging brake member and the brake adjustment mechanism, the housing including a side cover with removal thereof providing access to the brake adjustment mechanism, the side cover aligning with one of said elongate supports. The wheel fork assembly may have an inner side and the side cover extends along said inner side. The wheel fork assembly may have a side cover that is outwardly curved. The wheel fork assembly may have a side cover that is outwardly convex.

In one aspect, a wheel fork assembly for a manually operated, height-adjustable wheeled vehicle, the vehicle including a wheel-engaging brake member and a brake adjustment mechanism, is described. The wheel fork assembly includes a pair of elongate supports between which a wheel is received and to which the wheel rotatably couples; and a housing which couples together the supports and extends about the wheel-engaging brake member and the brake adjustment mechanism, the housing including a cover with removal thereof providing access to the brake adjustment mechanism, the cover aligning with an inner side of the wheel fork assembly.

The wheel fork assemblies described above may be used on a walker, a collator, a transport chair, a combination transport chair and walker, a wheelchair, a wheeled commode, an evacuation chair, and/or a height-adjustable stretcher.

Many advantages result from the structure of the present invention. For example, the cable adjuster is enclosed within the brake cable housing and thus not inadvertently dislodged and may be protected from damage/wear. The brake cable housing may provide convenient access for the cable adjuster, such as providing an opening to adjusted the cable adjuster and/or providing a latch to allow a user to open the brake cable housing to adjust the cable adjuster. The cable adjuster itself allows users to adjust the tension of the brake cable without disassembling the braking system, which can be used to compensate for wear on the brake pads and to compensate for a gradual elongation of the brake cable due to use. The new wheel fork structure allows a wider gait and greater tipping angle.

It will be appreciated that many variations are possible within the scope of the invention described herein. It will also be understood by someone skilled in the art that many of the details provided above are by way of example only and are not intended to limit the scope of the invention which is to be determined with reference to the following claims.

What is claimed is:

1. A brake assembly for a manually operated, height-adjustable wheeled vehicle, the brake assembly comprising:
   a brake cable assembly;

a brake cable housing shaped to enclose an excess portion of the brake cable assembly; and a cable adjuster coupled to the brake cable assembly, the cable adjuster being enclosed by the brake cable housing, wherein the brake cable assembly includes a cable and a cable sleeve extending about the cable, wherein the cable adjuster includes a first subassembly comprising a first sleeve shaped to receive and couple to an end of a first segment of the cable sleeve of said brake cable assembly, the first subassembly further comprising a threaded tube coupled to and extending outwards from the first sleeve, and wherein the cable adjuster includes a second subassembly comprising a second sleeve shaped to receive and couple to an end of a second segment of the cable sleeve of said brake cable assembly, the second subassembly further comprising a nut coupled to and extending outwards from said second sleeve, the nut threadably coupling to said threaded tube, with threaded adjustment of the nut along the threaded tube altering the effective length of the cable sleeve of the brake cable assembly.

2. The brake assembly as claimed in claim 1, the vehicle including a height-adjustable assembly having a longitudinal axis, wherein the brake cable housing couples to the height-adjustable assembly, and wherein the brake cable housing extends laterally outwards relative to said longitudinal axis.

3. The brake assembly as claimed in claim 1, the vehicle including a height-adjustable assembly, and wherein the brake cable housing abuts a front portion of the height-adjustable assembly and is coupled to at least one side portion of the height-adjustable assembly.

4. The brake assembly as claimed in claim 1, the vehicle including a height-adjustable assembly, and further including a planar member which couples the brake cable housing to a side portion of the height-adjustable assembly, and wherein the planar member couples to and extends in part along an outer side of the brake cable housing.

5. The brake assembly as claimed in claim 1, the vehicle including a height-adjustable assembly, and further including at least one connector extending outwards from the brake cable housing, the at least one connector including an arc-shaped portion which couples to and abuts a side portion of the height-adjustable assembly.

6. The brake assembly as claimed in claim 1, the vehicle including a height-adjustable assembly, and wherein the brake cable housing includes an outer portion having an inner peripheral edge, and wherein the excess portion of the brake cable assembly is configured to abut in part the inner peripheral edge of the outer portion of the brake cable housing when the height-adjustable assembly is in a retracted position and the cable adjuster is in an extended position, and wherein the brake cable housing includes an inner portion having an outer peripheral edge, and wherein the excess portion of the brake cable assembly is configured to abut in part the outer peripheral edge of the inner portion of the brake cable housing when the height-adjustable assembly is in an extended position and the cable adjuster is in a retracted position.

7. The brake assembly as claimed in claim 1, wherein the brake cable housing includes an inner portion having an outer peripheral edge, and wherein the excess portion of the brake cable assembly is configured to abut in part the outer peripheral edge of the inner portion of the brake cable housing when the height-adjustable assembly is in an extended position and the cable adjuster is in a retracted position.

8. The brake assembly as claimed in claim 1, wherein actuation of the cable adjuster alters an effective length of the cable sleeve of the brake cable assembly.

9. The brake assembly as claimed in claim 1, wherein the cable adjuster is inline with the brake cable assembly.

10. The brake assembly as claimed in claim 1, wherein a first portion of the brake cable assembly extends along the height-adjustable assembly and a second portion of the brake cable assembly is enclosed within the brake cable housing, wherein the second portion of the brake cable assembly is loop-shaped, and wherein the cable adjuster is inline with the second portion of the brake cable assembly.

11. The brake assembly as claimed in claim 1, wherein the nut is integrally connected to and formed with the second sleeve.

12. The brake assembly as claimed in claim 1, wherein the brake cable housing has an interior and includes a removable cover via which said interior is accessible.

13. A manually-operated, height-adjustable vehicle comprising the brake assembly as claimed in claim 1, the vehicle being one of a walker apparatus, a rollator, transport chair, a combination transport chair and walker apparatus, a wheelchair, a wheeled commode, an evacuation chair, and a height-adjustable stretcher.

14. A brake assembly for a manually operated, height-adjustable wheeled vehicle, the brake assembly comprising:

a brake cable assembly having a cable and a cable sleeve extending about the cable, the cable sleeve having a first segment and a second segment;

a brake cable housing shaped to enclose an excess portion of the brake cable assembly; and a cable adjuster coupled to the brake cable assembly, the cable adjuster being enclosed by the brake cable housing, the cable adjuster having a first subassembly having a first sleeve coupled to and extending outwards from an end of the first segment of the cable sleeve of the brake cable assembly, the first subassembly having a male member coupled to and extending outwards from the first sleeve, the cable adjuster having a second subassembly having a second sleeve coupled to and extending outwards from an end of the second segment of the cable sleeve of the brake cable assembly, the second subassembly having a female member coupled to and extending outwards from the second sleeve, the male member coupled to and selectively adjustable relative to the female member, wherein at least one of the female member and the male member is rotatably coupled to its corresponding segment of the cable sleeve of the brake cable assembly.

15. The brake assembly as claimed in claim 14, wherein the male member comprises a threaded tube and the female member comprises a threaded sleeve.

16. A manually-operated, height-adjustable vehicle including a height-adjustable assembly having a longitudinal axis, and a brake assembly comprising:

a brake cable assembly;

a brake cable housing shaped to enclose an excess portion of the brake cable assembly coupled to the height-adjustable assembly, and extending laterally outwards relative to said longitudinal axis; and a cable adjuster coupled to the brake cable assembly, the cable adjuster being enclosed by the brake cable housing;

wherein the brake cable assembly includes a cable and a cable sleeve extending about the cable, wherein the cable adjuster includes a first subassembly comprising a first sleeve shaped to receive and couple to an end of a first segment of the cable sleeve of said brake cable assembly, the first subassembly further comprising a threaded tube coupled to and extending outwards from the first sleeve, and wherein the cable adjuster includes a second subassembly comprising a second sleeve shaped to receive and couple to an end of a second segment of the cable sleeve of said brake cable assembly, the second subassembly further comprising a nut coupled to and extending outwards from said second sleeve, the nut threadably coupling to said threaded tube, with threaded adjustment of the nut along the threaded tube altering the effective length of the cable sleeve of the brake cable assembly, and wherein a first portion of the brake cable assembly extends along the height-adjustable assembly and a second portion of the brake cable assembly is enclosed within the brake cable housing.

* * * * *